US012795766B2

(12) United States Patent
Ramachandra et al.

(10) Patent No.: US 12,795,766 B2
(45) Date of Patent: Nov. 10, 2026

(54) RANDOM ACCESS REPORTS FOR REESTABLISHMENT

(71) Applicant: Telefonaktiebolaget LM Ericsson (PUBL), Stockholm (SE)

(72) Inventors: Pradeepa Ramachandra, Linköping (SE); Marco Belleschi, Solna (SE)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 501 days.

(21) Appl. No.: 17/998,530

(22) PCT Filed: May 20, 2021

(86) PCT No.: PCT/SE2021/050474
§ 371 (c)(1),
(2) Date: Nov. 11, 2022

(87) PCT Pub. No.: WO2021/235999
PCT Pub. Date: Nov. 25, 2021

(65) Prior Publication Data
US 2023/0189374 A1 Jun. 15, 2023

Related U.S. Application Data

(60) Provisional application No. 63/027,623, filed on May 20, 2020.

(51) Int. Cl.
*H04W 76/19* (2018.01)
*H04W 36/00* (2009.01)
(Continued)

(52) U.S. Cl.
CPC ....... *H04W 76/19* (2018.02); *H04W 36/0079* (2018.08); *H04W 36/305* (2018.08);
(Continued)

(58) Field of Classification Search
CPC ............. H04W 76/19; H04W 36/0079; H04W 36/305; H04W 74/0833; H04W 74/0836;
(Continued)

(56) References Cited

U.S. PATENT DOCUMENTS

| | | | | |
|---|---|---|---|---|
| 2013/0165108 A1* | 6/2013 | Xu | H04W 24/00 | 455/423 |
| 2014/0050197 A1* | 2/2014 | Legg | H04W 76/19 | 370/331 |

(Continued)

OTHER PUBLICATIONS

3GPP TSG-RAN WG2#107; Prague, Czech Republic; Source: Ericsson; Title: Post Radio Link Failure Measurements (R2-1910852)—Aug. 26-30, 2019.

(Continued)

*Primary Examiner* — Thai Nguyen
(74) *Attorney, Agent, or Firm* — Baker Botts L.L.P.

(57) ABSTRACT

According to some embodiments, a method performed by a wireless device comprises: determining (612) the wireless device should perform a connection reestablishment procedure; performing (614) a random access procedure related to the connection reestablishment procedure; and determining (616) whether the reestablishment procedure was successful. When the reestablishment procedure is determined to be successful, the method comprises: storing (618) a first set of information related to the establishment procedure; storing (620) a second set of information related to the establishment procedure, different from the first set of information, irrespective of whether the reestablishment procedure is determined to be successful; and transmitting (622) one or more reports that include the first set of information and the second set of information to a network node.

15 Claims, 13 Drawing Sheets

600

(51) Int. Cl.
*H04W 36/30* (2009.01)
*H04W 74/0833* (2024.01)
*H04W 74/0836* (2024.01)
*H04W 74/0838* (2024.01)

(52) U.S. Cl.
CPC .... *H04W 74/0833* (2013.01); *H04W 74/0836* (2024.01); *H04W 74/0838* (2024.01)

(58) Field of Classification Search
CPC ............. H04W 74/0838; H04W 24/10; H04W 36/085; H04W 36/302
See application file for complete search history.

(56) References Cited

U.S. PATENT DOCUMENTS

| | | | | |
|---|---|---|---|---|
| 2015/0024775 | A1* | 1/2015 | Jung | H04W 64/003<br>455/456.1 |
| 2015/0208295 | A1* | 7/2015 | da Silva | H04W 76/18<br>370/221 |
| 2019/0141592 | A1* | 5/2019 | Park | H04B 7/088 |
| 2023/0040079 | A1* | 2/2023 | Qu | H04W 24/10 |

OTHER PUBLICATIONS

3GPP TSG-RAN WG2 Meeting #107bis; Chongqing, P.R. China; Source: CATT (Rapporteur); Title: Output of Email Discussion [107#45] [ NRSON] RACH and Mobility Robustness Optimisation Checking (R2-1912147)—Oct. 14-18, 2019.

3GPP TSG-RAN WG3 Meeting #74; San Francisco, USA; Change Request; Title: Correction of the MRO definitions (R3-113015)—Nov. 14-18, 2011.

3GPP TSG-RAN WG3 Meeting #85bis; Shanghai China; Title: Solution proposal for MRO RRC re-establishment (R3-142478)—Oct. 6-10, 2014.

PCT International Search Report issued for International application No. PCT/SE2021/050474—Aug. 31, 2021.

PCT Written Opinion of the International Searching Authority issued for International application No. PCT/SE2021/050474—Aug. 31, 2021.

* cited by examiner

600

RANDOM ACCESS REPORTS FOR REESTABLISHMENT

PRIORITY

This nonprovisional application is a U.S. National Stage Filing under 35 U.S.C. § 371 of International Patent Application Serial No. PCT/SE2021/050474 filed May 20, 2021 and entitled "RANDOM ACCESS REPORTS FOR REESTABLISHMENT" which claims priority to U.S. Provisional Patent Application No. 63/027,623 filed May 20, 2020 both of which are hereby incorporated by reference in their entirety.

TECHNICAL FIELD

Embodiments of the present disclosure are directed to wireless communications and, more particularly, random access (RA) reports for connection reestablishment.

BACKGROUND

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features, and advantages of the enclosed embodiments will be apparent from the following description.

As in long term evolution (LTE), a random access procedure is described in the fifth generation (5G) new radio (NR) medium access control (MAC) specifications and parameters are configured by radio resource control (RRC), e.g., in system information or handover (RRCReconfiguration with reconfigurationWithSync). Most of the random access triggering conditions are similar to LTE, however, there are some situations in which random access is triggered for different reasons in the NR system.

The following list includes some of the scenarios in which random access is triggered:

- When the user equipment (UE) is in RRC_IDLE or RRC_INACTIVE and wants to access a cell in which it is camping on (i.e., transition to RRC_CONNECTED)
- When the UE needs to access a different cell from the source cell in which it is currently connected, e.g., random access towards a target cell at handover (i.e., reconfiguration with sync), or random access towards a target cell upon triggering RRC Connection Reestablishment
- When the amount of beam failure indications received from the physical layer for the serving synchronization signal blocks (SSBs)/channel state information reference signals (CSI-RSs) reaches a certain threshold, upon which random access is triggered potentially selecting a new SSB/CSI-RS

- When the UE needs to request system information on-demand
- When the UE receives a physical downlink control channel (PDCCH) order from the network, upon which the UE performs random access on configured contention-free random access (CFRA) resources. For example, the network may trigger PDCCH order when it was not able to communicate with a UE for a certain amount of time and there is the need for the UE to re-acquire uplink synchronization with the network
- When the UE has transmitted a certain amount of scheduling requests (SRs) without being able to transmit an uplink MAC protocol data unit (PDU), i.e., UE not received uplink grant
- When the UE needs to transmit an SR, but it has not been configured with SR resources
- In unlicensed scenarios, when the UE has declared consistent uplink listen-before-talk (LBT) failures in an uplink bandwidth part (BWP) of the SpCell. In this case, the UE triggers random access on another configured uplink BWP of the same SpCell that has physical random access channel (PRACH) resources and for which consistent uplink LBT failures have not been triggered In NR, random access channel (RACH) configuration is broadcasted in SIB1, as part of the servingCellConfigCommon (with both downlink and uplink configurations), where the RACH configuration is within the uplinkConfigCommon. The exact RACH parameters are within what is referred to as initialUplinkBWP, because this is the part of the uplink frequency the UE shall access and search for RACH resources.

RACH-ConfigGeneric Information Element

```
-- ASN1START
-- TAG-RACH-CONFIGGENERIC-START
RACH-ConfigGeneric ::=              SEQUENCE {
        prach-ConfigurationIndex            INTEGER (0..255),
        msg1-FDM                            ENUMERATED {one, two,
four, eight},                               INTEGER
        msg1-Frequencystart
(0..maxNrofPhysicalResourceBlocks-1),
        zeroCorrelationZoneConfig           INTEGER(0..15) ,
        preambleReceivedTargetPower         INTEGER (-202..-60),
        preambleTransMax                    ENUMERATED {n3, n4,
n5, n6, n7, n8, n10, n20, n50, n100, n200},
        powerRampingStep                    ENUMERATED {dB0,
dB2, dB4, dB6},
        ra-ResponseWindow                   ENUMERATED {sl1, sl2,
sl4, sl8, sl10, sl20, sl40, sl80},
        ...
}
-- TAG-RACH-CONFIGGENERIC-STOP
-- ASN1STOP
```

RACH-ConfigCommon Information Element

```
-- ASN1START
-- TAG-RACH-CONFIGCOMMON-START
RACH-ConfigCommon ::=               SEQUENCE {
    rach-ConfigGeneric                  RACH-ConfigGeneric,
    totalNumberOfRA-Preambles           INTEGER (1..63)
```

-continued

```
OPTIONAL,
-- Need S
    ssb-perRACH-OccasionAndCB-PreamblesPerSSB    CHOICE {
        oneEighth                                ENUMERATED
{n4,n8,n12,n16,n20,n24,n28,n32,n36,n40,n44,n48,n52,n56,n60,n64},
        oneFourth                                ENUMERATED
{n4,n8,n12,n16,n20,n24,n28,n32,n36,n40,n44,n48,n52,n56,n60,n64},
        oneHalf                                  ENUMERATED
{n4,n8,n12,n16,n20,n24,n28,n32,n36,n40,n44,n48,n52,n56,n60,n64},
        one                                      ENUMERATED
{n4,n8,n12,n16,n20,n24,n28,n32,n36,n40,n44,n48,n52,n56,n60,n64},
        two                                      ENUMERATED
{n4,n8,n12,n16,n20,n24,n28,n32},
        four                                     INTEGER (1..16),
        eight                                    INTEGER (1..8),
        sixteen                                  INTEGER (1..4)
    }
OPTIONAL,    -- Need M
    groupBconfigured                    SEQUENCE {
        ra-Msg3SizeGroupA                   ENUMERATED {b56,
b144, b208, b256, b282, b480, b640,
                                                    b800,
b1000, b72, spare6, spare5,spare4, spare3, spare2, spare1},
        messagePowerOffsetGroupB            ENUMERATED
{ minusinfinity, dB0, dB5, dB8, dB10, dB12, dB15, dB18},
        numberOfRA-PreamblesGroupA          INTEGER (1..64)
    }
OPTIONAL,    -- Need R
    ra-ContentionResolutionTimer            ENUMERATED { sf8,
sf16, sf24, sf32, sf40, sf48, sf56, sf64},
    rsrp-ThresholdSSB                       RSRP-Range
OPTIONAL,    -- Need R
    rsrp-ThresholdSSB-SUL                   RSRP-Range
OPTIONAL,    -- Cond SUL
    prach-RootSequenceIndex                 CHOICE {
        l839                                     INTEGER (0..837),
        l139                                     INTEGER (0..137)
}
    msg1-SubcarrierSpacing                  SubcarrierSpacing
OPTIONAL,    -- Cond L139
    restrictedSetConfig                     ENUMERATED
{unrestrictedSet, restrictedSetTypeA, restrictedSetTypeB},
    msg3-transformPrecoder                  ENUMERATED
{enabled}
OPTIONAL,    -- Need R
    ...
}
-- TAG-RACH-CONFIGCOMMON-STOP
-- ASN1STOP
```

In NR, the UE may initiate a reestablishment procedure when radio link failure (RLF) is detected. In general, the RLF is declared when any of the following events occurs:

- Upon T310 expiry, where the T310 is a timer that is started upon detecting physical layer problems for the SpCell, i.e., upon receiving N310 consecutive out-of-sync indications from lower layers
- Upon T312 expiry, where the T312 is a timer that is started upon triggering a measurement report for a measurement identity for which T312 has been configured, while T310 in PCell is running
- Upon random access problem indication while neither T300, T301, T304, T311 nor T319 are running. That is where the UE exceeds a threshold on the maximum amount of PRACH attempts that can be performed
- Upon indication that the maximum number of retransmissions has been reached
- Upon backhaul RLF indication received on a backhaul adaptation protocol (BAP) entity. That is where an integrated access and backhaul (IAB) node receives from its IAB parent node an indication that the link between the IAB parent node and one of the IAB grandparent nodes experiences RLF
- Upon indication of consistent uplink LBT failures. That is where the UE experiences consistent uplink LBT failures in all the BWPs configured with PRACH resources in the SpCell
- Upon T304 expiry, where the T304 is a timer started at handover, i.e., when the UE receives a message including reconfigurationWithSync or upon conditional reconfiguration execution, i.e., when applying a stored RRCReconfiguration message including reconfigurationWithSync. This applies both in case the T304 expires in the master cell group (MCG), or in the secondary cell group (SCG) if the MCG is suspended.
- Upon T316 expiry, where the T316 is started upon transmission of the MCGFailureInformation message and it is stopped upon resumption of MCG transmission, upon reception of RRCRelease
- Upon indication of beam failure recovery failure, where a beam failure recovery is initiated upon receiving from lower layers a certain number of beam failure indications. The beam failure recovery triggers a random access procedure which if fails may trigger RLF and hence a reestablishment procedure From specification perspective, most of the scenarios above are valid both for the MCG and SCG in case the MCG is already suspended.

Upon RLF, the UE selects a suitable cell, which may be the same cell or a different cell than the one in which the UE detected RLF, and it performs a reestablishment in such cell. If the reestablishment is successful, the UE can resume its normal operations, otherwise it will enter RRC_IDLE mode.

NR includes contention-based RACH (CBRA). In LTE, the RACH report assists the network to perform RACH optimization and contains an indication that collision was detected. With that information it is clear that at some point before the successful RACH procedure, the same UE tried to access the network and had a collision. In NR, a mechanism also exists for contention resolution for contention-based random access.

NR includes RACH partitioning per beam. In NR, random access resource selection needs to be performed within a cell depending on measurements performed on SSBs (synchronization signal blocks) or CSI-RSs. A cell in NR is basically defined by a set of these SSBs that may be transmitted in one (typical implementation for lower frequencies, e.g., below 6 GHz) or multiple downlink beams (typical implementation for lower frequencies, e.g., below 6 GHz). For the same cell, these SSBs carry the same physical cell identifier (PCI) and a master information base (MIB). For standalone operation, i.e., to support UEs camping on an NR cell, they also carry in SIB1 the RACH configuration, which comprises a mapping between the detected SSB covering the UE at a given point in time and the PRACH configuration (e.g., time, frequency, preamble, etc.) to be used. For that, each of the beams may transmit its own SSB which may be distinguished by an SSB index. An example is illustrated in FIG. 1.

FIG. 1 is a network diagram illustrating beam transmission in NR. The top example illustrates a single beam covering the cell with an associated PSS/SSS. The bottom example illustrates a cell with multiple beams. Each beam is associated with a PSS/SSS and a beam index.

The mapping between RACH resources and SSBs (or CSI-RS) is also provided as part of the RACH configuration (in RACH-ConfigCommon). Two relevant parameters are the #SSBs-per-PRACH-occasion (⅛, ¼, ½, 1, 2, 8 or 16, which represents the number of SSBs per RACH occasion)

and the #CB-preambles-per-SSB preambles to each SS-block (within a RACH occasion, the number of allocated preambles).

In a first example, if the number of SSBs per RACH occasion is 1, and if the UE is under the coverage of a specific SSB, e.g., SSB index 2, there will be a RACH occasion for that SSB index 2. If the UE moves and is now under the coverage of another specific SSB, e.g., SSB index 5, there will be another RACH occasion for that SSB index 5, i.e., each SSB detected by a given UE would have its own RACH occasion.

Thus, at the network side, upon detecting a preamble in a particular RACH occasion the network knows which SSB the UE has selected and, consequently, which downlink beam is covering the UE, so that the network can continue the downlink transmission, e.g., RAR, etc. The factor 1 is an indication that each SSB has its own RACH resource. A preamble detected there indicates to the network which SSB the UE has selected, i.e., which downlink beam the network should use to communicate with the UE, such as the one to send the random access response (RAR).

FIG. 2 is a timing diagram illustrating mapping of a SSB to a single PRACH occasion. The horizontal axis represents time and the vertical axis represents frequency. Each of the SS-Blocks 0-3 map to their own PRACH occasion, as illustrated by the arrows.

Each SS-block typically maps to multiple preambles (different cyclic shifts and Zadoff-Chu roots) within a PRACH occasion, so that it is possible to have multiple different UEs in the same RACH occasions since they may be under the coverage of the same SSB.

In a second example, illustrated in FIG. 3, the number of SSBs per RACH occasion is two. Thus, a preamble received in that RACH occasion indicates to the network that one of the two beams are being selected by the UE. Either the network has an implementation to distinguish the two beams and/or should perform a beam sweeping in the downlink by transmitting the RAR in both beams, either simultaneously or, transmitting in one, waiting for a response from the UE, and if absent, transmit in the other.

FIG. 3 is a timing diagram illustrating mapping of two SSBs to a single PRACH occasion. The horizontal axis represents time and the vertical axis represents frequency. SS-Blocks 0 and 1 map to a first PRACH occasion and SS-Blocks 2 and 3 map to a second PRACH occasion, as illustrated by the arrows.

NR also includes contention-free random access (CFRA). For example, in NR, as in LTE, the UE may be configured to perform CFRA in different scenarios, e.g., during handovers, or upon network request via PDCCH order, for contention-free beam failure recovery, or for SI-request.

For example, in the case of handover, the configuration is in the reconfigurationWithSync of IE ReconfigurationWithSync (which is in the CellGroupConfig IE, transmitted in the RRCReconfiguration message), and it is provided in RACH-ConfigDedicated as shown below:

```
ReconfigurationWithSync ::=      SEQUENCE {
    spCellConfigCommon                   ServingCellConfigCommon
OPTIONAL,   -- Need M
    newUE-Identity                       RNTI-Value,
    t304                                 ENUMERATED {ms50, ms100,
ms150, ms200, ms500, ms1000, ms2000, ms10000},
    rach-ConfigDedicated                 CHOICE {
        uplink                               RACH-ConfigDedicated,
        supplementaryUplink                  RACH-ConfigDedicated
    }
OPTIONAL,   -- Need N
    ...,
    [[
    smtc                                 SSB-MTC
OPTIONAL   -- Need S
    ]]
}
```

RACH-ConfigDedicated Information Element

```
-- ASN1START
-- TAG-RACH-CONFIG-DEDICATED-START
RACH-ConfigDedicated :: =            SEQUENCE {
        cfra                                 CFRA OPTIONAL, -- Need S
        ra-Prioritization                    RA-Prioritization
OPTIONAL, -- Need N
        ...
}
CFRA ::=                         SEQUENCE {
        occasions                            SEQUENCE {
            rach-ConfigGeneric                   RACH-ConfigGeneric,
            ssb-perRACH-Occasion                 ENUMERATED {oneEighth,
oneFourth, oneHalf, one, two, four, eight, sixteen}   OPTIONAL   --
Cond SSB-CFRA
        }
OPTIONAL, -- Need S
        resources                            CHOICE {
            ssb                                  SEQUENCE {
                ssb-ResourceList                     SEQUENCE (SIZE(1..maxRA-
SSB-Resources)) OF CFRA-SSB-Resource,
                ra-ssb-OccasionMaskIndex             INTEGER (0..15)
            },
            csirs                                SEQUENCE {
                csirs-ResourceList                   SEQUENCE (SIZE(1..maxRA-
CSIRS-Resources)) OF CFRA-CSIRS-Resource,
                rsrp-ThresholdCSI-RS                 RSRP-Range
            }
        },
```

-continued

```
        ...,
        [[
        totalNumberOfRA-Preambles-v1530 INTEGER (1..63)
OPTIONAL        -- Cond Occasions
        ]]
}
CFRA-SSB-Resource ::=              SEQUENCE {
        ssb                                SSB-Index,
        ra-PreambleIndex                   INTEGER (0..63),
        ...
}
CFRA-CSIRS-Resource ::=            SEQUENCE {
        csi-RS                             CSI-RS-Index,
        ra-OccasionList                    SEQUENCE (SIZE (1. .maxRA-
OccasionsPerCSIRS)) OF INTEGER (0..maxRA-Occasions-1),
        ra-PreambleIndex                   INTEGER (0..63),
        ...
}
-- TAG-RACH-CONFIG-DEDICATED-STOP
-- ASN1STOP
```

As illustrated in the notation above, RACH resources may be mapped to beams (e.g., SSBs or CSI-RS resources that may be measured by the UE). Thus, when CFRA resources are provided they are also mapped to beams and that may be done only for a subset of beams in a given target cell. The consequence is that to use CFRA resources the UE needs to select a beam for which it has CFRA resources configured in the dedicated configuration. In the case of SSBs, for example, that may be found in the ssb-ResourceList which is a SEQUENCE (SIZE(1 . . . maxRA-SSB-Resources)) OF CFRA-SSB-Resource.

In particular, according to the MAC specification, the UE will select the SSB/CSI-RS for which the SSB/CSI-RS RSRP is above the rsrp-ThresholdSSB/rsrp-ThresholdCSI-RS amongst the SSBs/CSI-RS associated to the configured CFRA resources.

In some other cases, the CFRA configuration is not provided in RACH-ConfigDedicated, but rather in RACH-ConfigGeneric, e.g., for the case of contention free beam failure recovery, or for SI-request. That means that the UE may select any SSB or CSI-RS as long as the perceived reference signal receive power (RSRP) of the selected beam is above a given threshold. For SI-request, the UE is also allowed to select any SSB, if there is no available SSB with RSRP above a threshold.

In yet another case, i.e., for random access triggered by PDCCH order, the beam the UE shall select for CFRA is explicitly indicated in the PDCCH order itself.

An enhancement to the random access procedure is referred to as a 2-step RACH procedure. In the 2-step RACH procedure, the UE can complete the random access in two steps rather than in the classical steps. In practice, this technical enhancement enables the UE to transmit physical uplink shared channel (PUSCH) data, already in the first random access (RA) message rather than in the third RA message as in the 4-step RACH. Therefore, with the 2-step RACH, the first RA message conveys both the PRACH and the PUSCH payload. Consequently, the contention resolution can take place with the second RA message.

An advantage of the 2-step RACH procedure over the 4-step RACH is that the 2-step RACH is much faster. In particular, the minimum latency that can be achieved between the PRACH transmission until msg4 reception, i.e., contention resolution, with the 4-step RACH, is 13 subframes. As comparison, for 2-step RACH, the minimum achievable latency is 4 subframes. This makes 2-step RACH around 3 times faster than 4-step RACH. Therefore, the 2-step RACH approach may be particularly attractive for delay-sensitive use cases, and also in unlicensed networks. That is because the 2-step approach, unlike the 4-step approach, includes only two LBT procedures (one at UE side for msgA transmission, and one at the network side for the msgB transmission), thereby making the 2-step much faster especially in case of congested network where the UE/gNB may need to postpone several times the transmission of random access messages due to LBT failures, i.e., channel busy.

On the other hand, in 2-step RACH, the UE may transmit data, i.e., the payload, as part of msgA, i.e., before getting a proper uplink timing alignment from the network. Additionally, data transmitted in msgA have not been link adapted by the network. This means that the probability of properly decoding the payload at network side very much depends on how already good the uplink synchronization is, e.g., it may depend on the cell size, and also on how good the link quality is. Given the above, assuming that the BWP selected for random access procedure has both 4-step and 2-step RACH resources configured, the UE shall select the 2-step RACH resources only if the estimated downlink RSRP is above a certain configurable threshold.

Third Generation Partnership Project (3GPP) cellular communication, for both LTE and NR, include MDT (minimization drive test) reporting. The purpose of MDT is for the UE to store information about different measurements that the UE may perform both in IDLE and connected mode. Typical measurements that a UE may log are the qualities of the cells the UE traverses when moving, or statistics about transmission delays the UE experiences, or events such as RLF or handover failures. Such reports may then be requested by the network and used for different purposes, such as coverage optimization, mobility optimization, capacity optimization, QoS verification, and ultimately SON (self-organizing network).

In particular, using a MDT RACH signaling mechanism, for each success random access procedure, the UE includes a list of successful RA reports in RA-Report. In such report, the UE signals to the network the RA resources used for the random access, as well as the reasons for why the UE triggered RA. Below is an example report.

```
RA-ReportList-r16 ::= SEQUENCE (SIZE (1..maxRAReport))
OF RA-Report-r16
RA-Report-r16 ::=                    SEQUENCE {
    cellId-r16                   CGI-InfoNR,
    absoluteFrequencyPointA-r16      ARFCN-ValueNR,
        locationAndBandwidth             INTEGER (0..37949),
        subcarrierSpacing                SubcarrierSpacing,
    msg1-FrequencyStart              INTEGER
(0..maxNrofPhysicalResourceBlocks-1) ,
        msg1-SubcarrierSpacing          SubcarrierSpacing,
    raPurpose                    ENUMERATED {accessRelated,
beamFailureRecovery, reconfigurationWithSync, ulUnSynchronized,
                                 schedulingRequestFailure,
noPUCCHResourceAvailable, sCellAdditionTAAdjestment,
                                 requestForOtherSI, spare8,
spare7, spare6, spare5, spare4, spare3, spare2, spare1},
    perRAInfoList-r16            PerRAInfoList-r16
}
```

Additionally, the UE may report failures related to random access as part of the RLF-report. This is the case in which the UE has detected RLF, i.e., any of the events listed above occurred. In this case, if the RLF report is due to random access problems or beam failure recovery failures, the UE includes the latest random access attempts in chronological order in the perRAInfoList.

In particular, from MDT signaling perspective, the RLF report may contain reports related to RLF or handover failure (HOF), wherein the HOF event is associated to the expiry of the T304 timer. The UE may also include in such report the ssb-Index (or the CSI-RS index) associated to a given preamble transmission, the number of preambles sent for this ssb-Index, information related to whether contention resolution was successful or not, the experienced downlink RSRP quality, the location of the failure, the failed cell in case of RLF, the reestablishmentCellId which is the cell in which the UE has attempted reestablishment, the previous cell in case of HOF, etc.

```
PerRAInfoList-r16 ::= SEQUENCE (SIZE (1..200)) OF PerRAInfo-r16
PerRAInfo-r16 ::=          CHOICE {
  perRASSBInfoList-r16              PerRASSBInfo-r16,
  perRACSI-RSInfoList-r16           PerRACSI-RSInfo-r16
}
PerRASSBInfo-r16 ::= SEQUENCE {
      ssb-Index-r16                          SSB-Index,
      numberOfPreamblesSentOnSSB-r16         INTEGER (1..200),
      perRAAttemptInfoList-r16         PerRAAttemptInfoList-r16
}
PerRACSI-RSInfo-r16 ::= SEQUENCE {
      csi-RS-Index-r16                       CSI-RS-Index,
      numberOfPreamblesSentOnCSI-RS-r16      INTEGER (1..200),
      perRAAttemptInfoList-r16         PerRAAttemptInfoList-r16
}
PerRAAttemptInfoList-r16 ::=             SEQUENCE (SIZE (1..200)) OF
PerRAAttemptInfo-r16
PerRAAttemptInfo-r16 ::=                     SEQUENCE {
      contentionDetected-r16             BOOLEAN,
      dlRSRPQualityIndicator-r16         BOOLEAN,
      ...
}
RLF-Report-r16 ::=                       SEQUENCE{
      measResultLastServCell-r16              MeasResultRLFNR-r16,
      measResultNeighCells-r16                SEQUENCE {
          measResultListNR-r16              MeasResultList2NR-r16
      OPTIONAL,
          measResultListEUTRA-r16             MeasResultList2EUTRA-r16
      OPTIONAL
  }                                                            OPTIONAL,
  c-RNTI-r16                       RNTI-Value,
  previousPCellId-r16                  CGI-InfoNR              OPTIONAL,
  failedPCellId-r16                    CHOICE {
    cellGlobalId-r16                     CGI-InfoNR,
    pci-arfcn-r16                        SEQUENCE {
      physCellId-r16                         PhysCellId,
      carrierFreq-r16                          ARFCN-ValueNR
    }
  }                                                     OPTIONAL,
  reestablishmentCellId-r16            CGI-InfoNR                 OPTIONAL,
  timeConnFailure-r16              INTEGER (0..1023)              OPTIONAL,
  timeSinceFailure-r16             TimeSinceFailure-r16,
  connectionFailureType-r16            ENUMERATED {rlf, hof}
  OPTIONAL,
  rlf-Cause-r16                    ENUMERATED {
                                   t310-Expiry, randomAccessProblem,
                                   rlc-MaxNumRetx,
beamFailureRecoveryFailure, spare4, spare3, spare2, spare1},
  locationInfo-r16                 LocationInfo-r16               OPTIONAL,
  perRAInfoList-r16                PerRAInfoList-r16              OPTIONAL
}
```

Similarly, the random access failures are also included in conjunction with connection establishment failure at initial connection or resume, i.e., upon T300 or T319 expiry. In such case, the random access report is included in the perRAInfoList as for the RLF/HOF report case.

```
ConnEstFailReport-r16 ::=                SEQUENCE {
    measResultFailedCell-r16                 MeasResultFailedCell-r16,
    locationInfo-r16                         LocationInfo-r16
OPTIONAL,
    measResultNeighCells-r16                 SEQUENCE {
        measResultNeighCellListNR                MeasResultList2NR-r16
OPTIONAL,
        measResultNeighCellListEUTRA             MeasResultList2EUTRA-
r16         OPTIONAL
    },
    numberOfConnFail-r16                     INTEGER (0..7),
    perRAInfoList-r16                            PerRAInfoList-r16
OPTIONAL,
    timeSinceFailure-r16                     TimeSinceFailure-r16,
    ...
}
```

The above information is stored by the UE in certain containers, e.g., the VarRA-Report container for the successful RA reports, the VarRLF-Report for the RLF reports, the VarConnEstFailReport for the connection establishment failures, etc. The UE may then indicate to the network the availability of such information stored in the UE, and then later the network may request at any point in time the transmission of such information. Such information are typically used by the network for network performance optimization, e.g., mobility optimization, random access optimization and more in general SON.

There currently exist certain challenges. For example, the reestablishment procedure following an RLF may end up in a successful reestablishment, in which case the UE can resume its normal operations in connected mode, or in a failed reestablishment, in which case the UE goes in RRC_IDLE mode.

In current specifications, from the RLF report it is not possible to determine whether a reestablishment was successful or not, because the RLF-report only contains the reestablishmentCellId, which is the cell in which the UE attempted to reestablish, and not necessarily the cell in which the UE successfully reestablished. The network may deduce such information from a RA report that only includes successful RA events, however the RA report does not contain any information on whether the RA-report is related to reestablishment procedure or not.

In summary, the network is not able to determine whether a reestablishment was successful or not, neither from the information contained in the RLF report nor from the RA report.

SUMMARY

Based on the description above, certain challenges currently exist with random access reporting for reestablishment. Certain aspects of the present disclosure and their embodiments may provide solutions to these or other challenges. For example, in some embodiments the user equipment (UE) reports information on whether a given reestablishment procedure was successful or not, wherein such information can be conveyed either as part of the radio link failure (RLF) report, which contains all the information related to a declared RLF event, or as part of the random access (RA) report, which only includes information related to successfully completed random access events.

In some embodiments, the network collects such information related to a successful reestablishment, to optimize radio resource configuration, scheduling allocation, handover triggering conditions, etc.

According to some embodiments, a method performed by a wireless device comprises: determining the wireless device should perform a connection reestablishment procedure; performing a random access procedure related to the connection reestablishment procedure; and determining whether the reestablishment procedure was successful. When the reestablishment procedure is determined to be successful, the method comprises: storing a first set of information related to the establishment procedure; storing a second set of information related to the establishment procedure, different from the first set of information, irrespective of whether the reestablishment procedure is determined to be successful; and transmitting one or more reports that include the first set of information and the second set of information to a network node.

In particular embodiments, storing the first set of information comprises storing the first set of information in a RLF report; storing the second set of information comprises storing the second set of information in the RLF report; and transmitting one or more reports to the network node comprises transmitting the RLF report.

In particular embodiments, storing the first set of information comprises storing the first set of information in a RA report; storing the second set of information comprises storing the second set of information in a RLF report; and transmitting one or more reports to the network node comprises transmitting the RLF report and the RA report.

In particular embodiments, the first set of information comprises any one or more of: a cell identifier of a cell in which the reestablishment procedure was performed successfully; an identifier of random access resources used for the reestablishment procedure; and an amount of time elapsed between a RLF declaration and the successful reestablishment procedure. The first set of information may comprise any one or more of: at least one of cell level and beam level radio measurements associated with the cell in which the reestablishment procedure was successful; an indication of a chronological order in which beams were used for performing one or more random access procedure related to the connection reestablishment procedure; and an indication of a location of the wireless device during the reestablishment procedure.

In particular embodiments, the second set of information comprises any one or more of: an indication of whether the one more reports is associated with a successful reestablishment procedure; a cell identifier of a cell in which the reestablishment procedure was attempted; and an indication of a RLF event that triggered the reestablishment procedure.

According to some embodiments, a wireless device comprises processing circuitry operable to perform any of the wireless device methods described above.

Also disclosed is a computer program product comprising a non-transitory computer readable medium storing computer readable program code, the computer readable program code operable, when executed by processing circuitry to perform any of the methods performed by the wireless device described above.

According to some embodiments, a method performed by a first network node comprises: receiving a report from a wireless device; determining a source of a failed handover based on the report; and transmitting an indication of the source of the failed handover to a second network node.

In particular embodiments, the second network node comprises at least one of a source node of the failed handover and a target node of the failed handover.

In particular embodiments, the received report comprises a RLF report. The report may comprise any one or more of: a cell identifier of a cell in which a reestablishment procedure was performed successfully; an identifier of random access resources used for a reestablishment procedure; and an amount of time elapsed between a RLF declaration and a successful reestablishment procedure. The report may comprise any one or more of: at least one of cell level and beam level radio measurements associated with a cell in which a reestablishment procedure was successful; an indication of a chronological order in which beams were used for performing one or more random access procedure related to the connection reestablishment procedure; and an indication of a location of a wireless device during the reestablishment procedure. The report may comprise any one or more of: an indication of whether the report is associated with a successful reestablishment procedure; a cell identifier of a cell in which a reestablishment procedure was attempted; and an indication of a RLF event that triggered a reestablishment procedure.

According to some embodiments, a network node comprises processing circuitry operable to perform any of the network node methods described above.

Also disclosed is a computer program product comprising a non-transitory computer readable medium storing computer readable program code, the computer readable program code operable, when executed by processing circuitry to perform any of the methods performed by the network node described above.

Certain embodiments may provide one or more of the following technical advantages. For example, some embodiments enable the network to determine whether the information related to a reestablishment procedure that the UE executed concern a successful reestablishment or an unsuccessful reestablishment. The network may optimize network parameters based on the information.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
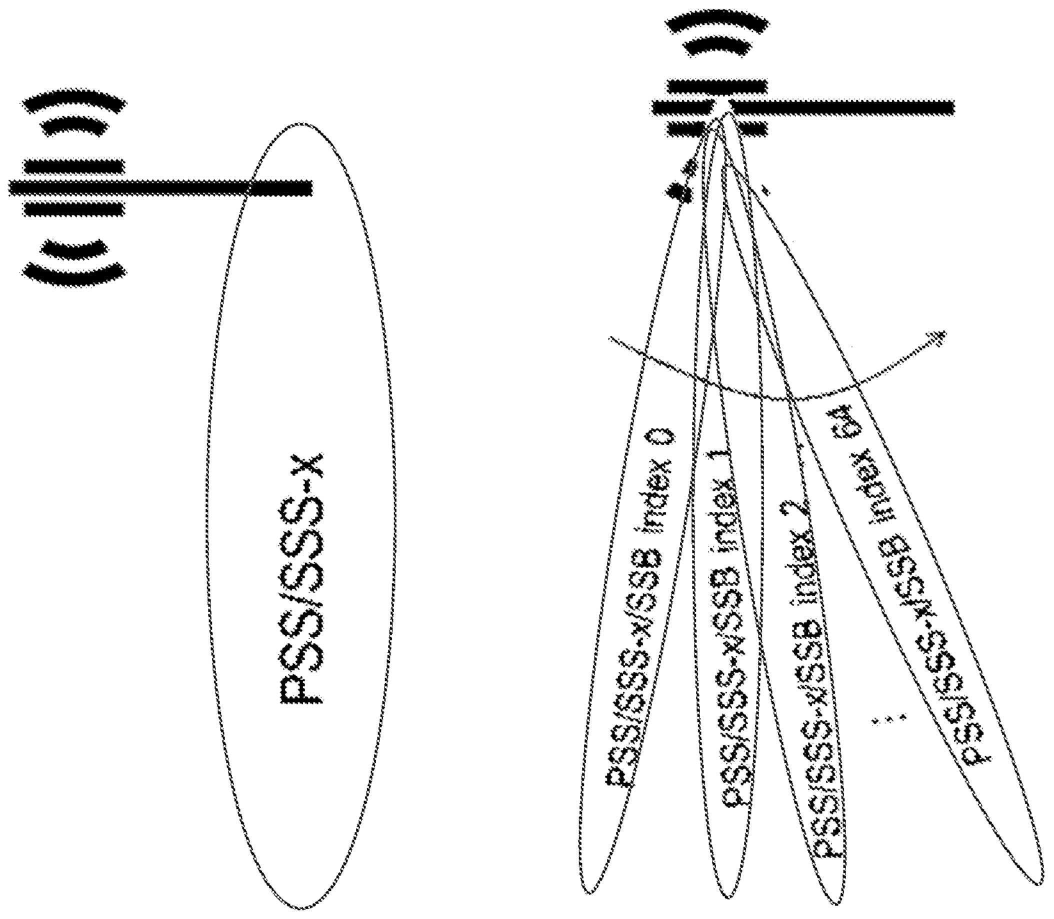
FIG. 1 is a network diagram illustrating beam transmission in NR.
Figure 2:
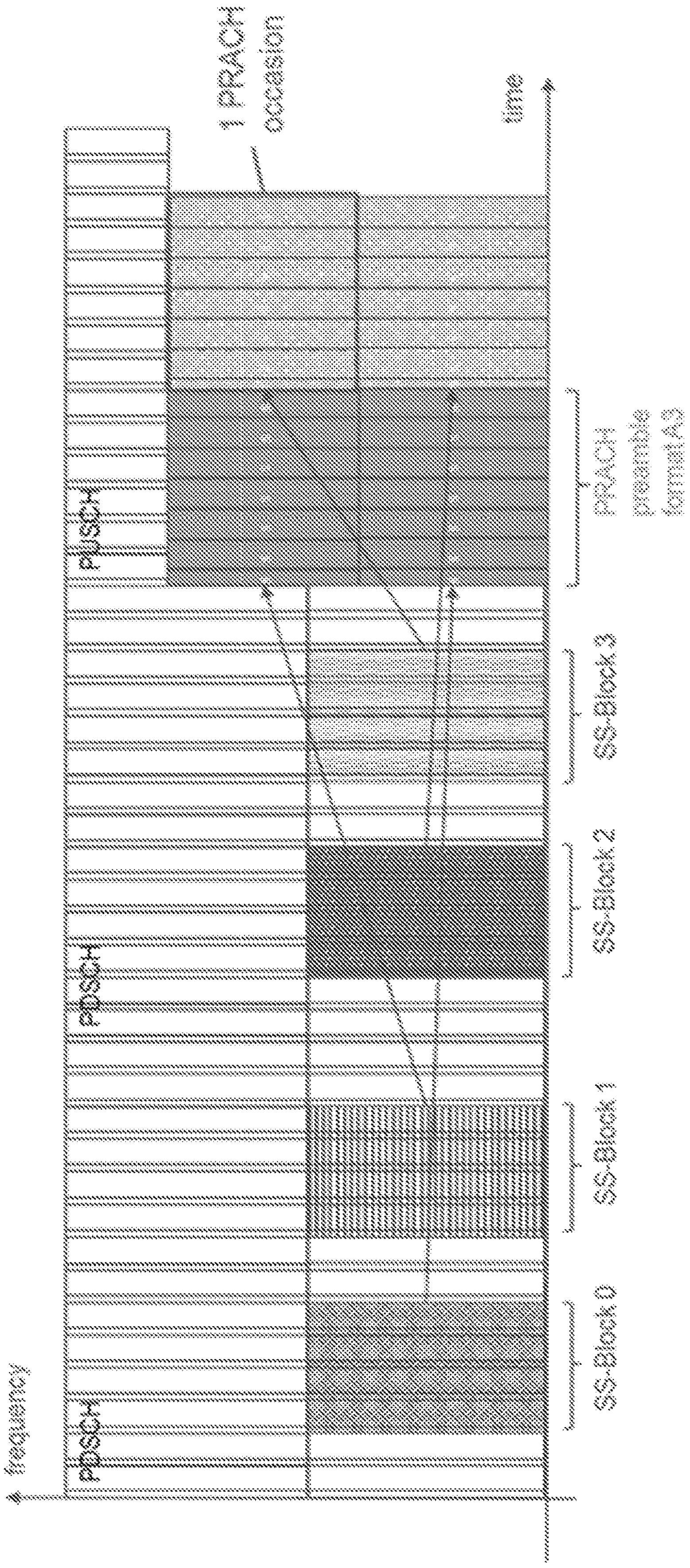
FIG. 2 is a timing diagram illustrating mapping of a SSB to a single PRACH occasion.
Figure 3:
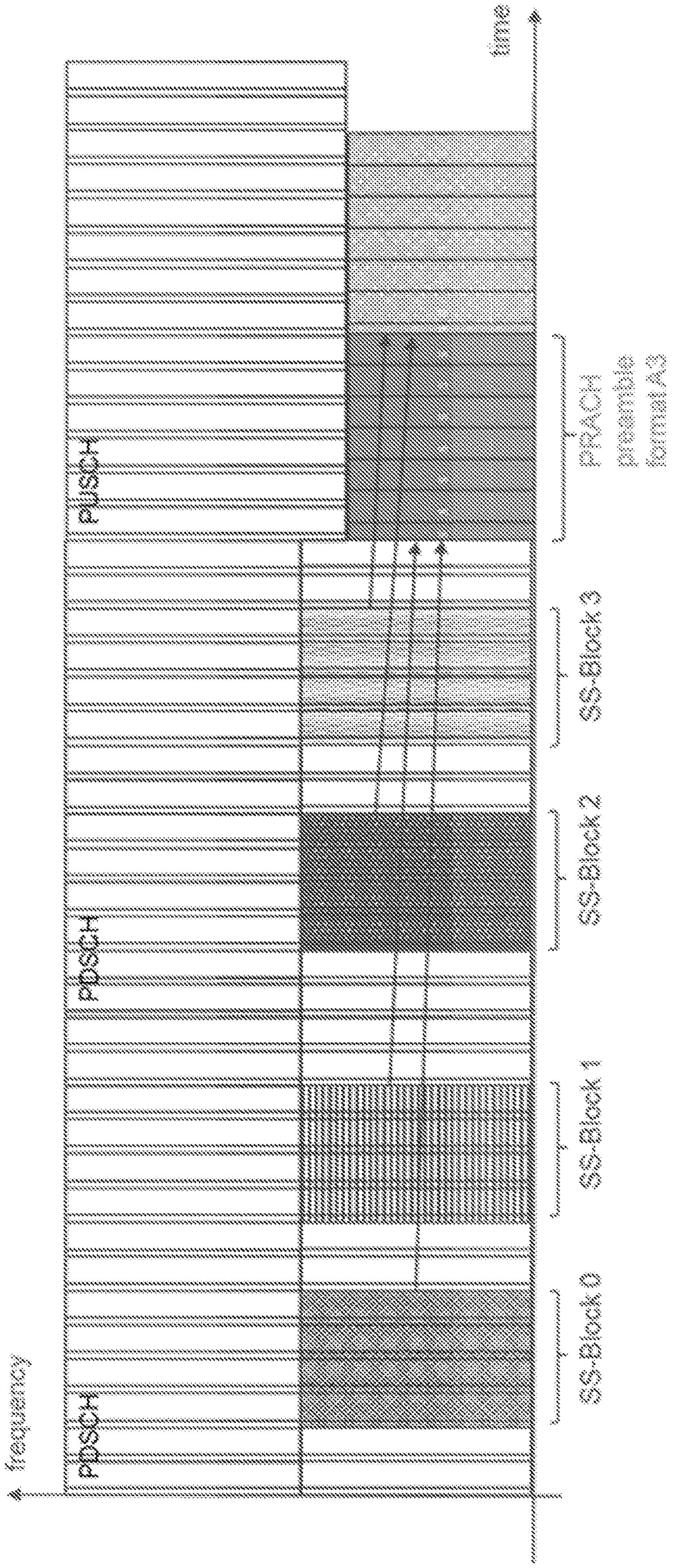
FIG. 3 is a timing diagram illustrating mapping of two SSBs to a single PRACH occasion.

As described above, certain challenges currently exist with random access reporting for reestablishment. Certain aspects of the present disclosure and their embodiments may provide solutions to these or other challenges. For example, in some embodiments the user equipment (UE) reports information on whether a given reestablishment procedure was successful or not, wherein such information can be conveyed either as part of the radio link failure (RLF) report, which contains all the information related to a declared RLF event, or as part of the random access (RA) report, which only includes information related to successfully completed random access events.

Particular embodiments are described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

In some embodiments, a UE performs the following steps. At step 101, the UE fulfills a certain condition to trigger a reestablishment procedure. At step 102, the UE performs a random access procedure related to the concerned reestablishment procedure. At step 103, the UE determines whether the reestablishment procedure was successful or not. A step 104, the UE stores in an RA report a first set of information related to the concerned reestablishment procedure, if the concerned reestablishment procedure was successful. At step 105, the UE stores in an RLF report a second set of information, different from the first set, related to the concerned reestablishment procedure, irrespective of whether the concerned reestablishment procedure was successful or not. At step 106, the UE transmits the RA report and/or the RLF report upon network request.

The UE performs step 104 if the UE determines in step 103 that the reestablishment procedure is successful, i.e., RRCReestablishment message is received by the UE.

The first set of information that the UE stores in the RA report may comprise, for example, the cell ID in which reestablishment was attempted successfully, the physical random access channel (PRACH) resources used for the concerned reestablishment procedure, the amount of time elapsed between RLF declaration and successful reestablishment, i.e., reception of RRCReestablishment message by the UE, and/or a plurality of measurements associated to the reestablishment procedure in the cell.

The plurality of measurements may include any one or more of the following. The measurements may include the cell level and beam level radio measurements (received signal strength indicator (RSSI), reference signal receive power (RSRP), reference signal receive quality (RSRQ), signal to interference plus noise ratio (SINR). etc.) associated to the cell in which reestablishment was successful at the point in time in which the reestablishment was initiated, i.e., RRCReestablishmentRequest transmitted, or at the point in time in which the cell was selected for reestablishment, or the latest available radio measurement.

The plurality of measurements may include the chronological order in which different beams were used for performing the respective RA attempts in the RA procedure. For each of the attempts, including an indication whether the UE experienced any contention and may include a further indication whether the downlink beam corresponding to the RA resource was above a threshold.

The first set of information that the UE stores in the RA report may further comprise the location of the UE at the point in time in which the reestablishment was initiated, i.e., RRCReestablishmentRequest transmitted, or at the point in time in which the cell was selected for reestablishment, or the latest available location.

Some embodiments may include the amount of LBT failures perceived during the reestablishment procedure.

The first set of information that the UE stores in the RA report may further comprise the RA purpose, which may be for example "reestablishment."

Some embodiments may include an index to the RLF report related to the concerned reestablishment and stored in step 105. Some embodiments may include an index of the RA report.

The UE performs step 105 both when the concerned reestablishment procedure was successful or not. The second set of information that the UE stores in the RLF report may comprise any one or more of the following.

The second set of information that the UE stores in the RLF report may include a flag indicating whether the RLF report is associated to a reestablishment procedure which was successful, i.e., UE kept the RRC Connection, or not, i.e., the UE entered RRC_IDLE mode.

Some embodiments may include the cell in which reestablishment was attempted, which could be the cell in which reestablishment was performed unsuccessfully (if the flag above indicates that the RLF report is associated to an unsuccessful reestablishment), or the cell in which reestablishment was performed successfully (if the flag above indicates that the RLF report is associated to a successful reestablishment). Alternatively, the UE includes only the cell in which reestablishment was performed unsuccessfully.

Some embodiments include a plurality of information associated to the RLF event that triggered the concerned reestablishment procedure. Some examples include: the cell in which RLF was detected; the cell level and beam level radio measurements (RSSI/RSRP/RSRQ) in the cell in which RLF was detected, e.g., at the point in time in which RLF was declared, or the latest available radio measurement before RLF was declared; the location of the UE at the point in time in which RLF was declared, or the latest available location before RLF was declared; and/or the BWP(s) and/or the SSBs/CSI-RSs the UE was using before RLF was declared. For example, for consistent LBT failures, some embodiments include an indication of all the BWPs used in the SpCell before declaring RLF.

Some additional examples include the cause that triggered the RLF, e.g., consistent LBT failures in all BWPs, BH RLF failure, etc.

When the reestablishment was unsuccessful, some embodiments include an indication to inform the reason for the reestablishment failure, e.g., random access problem or non-reception of RRCReestablishment/RRCSetup from the network upon transmitting RRCReestablishmentRequest message within a certain time.

The second set of information that the UE stores in the RLF report may further comprise an index to the corresponding RA report associated to the concerned reestablishment procedure, if the reestablishment was successful, and/or an index of the RLF report.

In another UE embodiment, a UE performs the following steps. At step 201, the UE fulfills a certain condition to trigger a reestablishment procedure. At step 202, the UE performs a random access procedure related to the concerned reestablishment procedure. At step 203, the UE determines whether the reestablishment procedure was successful. At step 204, the UE does not store any information in the RA report related to the random access procedure associated to the concerned reestablishment procedure. At step 205, the UE stores in an RLF report a first set of information if the concerned reestablishment procedure was successful. At step 206, the UE stores in the same RLF report of step 105 a second set of information, different from the first set, irrespective of whether the concerned reestablishment procedure was successful. At step 207, the UE transmits the RLF report upon network request.

In these embodiments, the RA report does not contain any information about the random access procedure associated to the successful reestablishment. All the information related to this reestablishment are stored in the RLF report. In a variant method, the only information stored in the RA report could be an index to the RLF report, which implies that the network may retrieve all the information related to this successful RA in the corresponding RLF report.

The UE performs step 205 if the UE determines in step 203 that the reestablishment procedure is successful. The first set of information may be the same as the first set of information disclosed in the embodiments above.

The UE also performs step 206, wherein the second set of information may be the same as the second set of information disclosed in the embodiments above.

A general flowchart illustrating both of the above methods is described with respect to FIG. 6 below.

Some embodiments include actions at a network node. Based on the information provided by the UE in the RLF report, the network nodes involved in the RLF report can identify the failure cause effectively. For example, when the RLF report indicates that the reestablishment was successful and if the reestablishment cell was different from the source cell (previousPCell in the RLF report) and the target cell (failedPCell in the RLF report) of the handover, then the cell (source cell of the handover) that performs the handover failure classification can classify this failure as a handover to wrong cell scenario and perform the handover parameter tuning related to target cell (e.g., increase the cell individual offset) and reestablishment cell (e.g., decrease the cell individual offset). Methods related to such a procedure are listed below.

In the embodiments described below, the first network node refers to the source node of the handover, the second network node refers to the target node of the handover, the third network node refers to the successful re-establishment node of the handover, and the fourth network node refers to the network node in which the UE reports the RLF report whose contents are as described in the embodiments above.

In some embodiments, a method performed by a fourth network node comprises the following steps. At step 501 the fourth network node sends a request to the UE to transmit the stored RLF report. At step 502, the fourth network node receives the RLF report from the UE. At step 503 the fourth network node determines the cell in which the handover had failed based on the contents of the RLF report. At step 504, the fourth network node sends the RLF indication message, either including or excluding the RLF report, to the second network node.

In some embodiments, a method performed by the second network node comprises the following steps. At step 301, the second network node receives the RLF indication message from the fourth network node. At step 302, the second network node determines the failure cause to be handover to wrong cell from the first network node. At step 303 the second network node sends a handover report message to the first network node indicating that the handover initiated by the first network node towards second network node was a “handover to wrong cell” involving the third network node.

In some embodiments, a method performed by the first network node comprises the following steps. At step 601, the first network node receives a handover report message from the second network node. At step 602, the first network node changes handover parameters (Cell individual offset, A3 offset, time-to-trigger, etc.) associated the measurements reports involving measurements towards the second network node and the third network node. In some embodiments the changing involves decreasing the cell individual offset towards the third network node and increasing the cell individual offset towards the second network node.

In some embodiments, a method performed by the fourth network node comprises the following steps. At step 701, the fourth network node sends a request to the UE to transmit the stored RLF report. At step 702, the fourth network node receives the RLF report from the UE. At step 703, the fourth network node determines the source cell of the failed handover based on the contents of the RLF report. At step 705, the fourth network node sends the RLF indication message, either including or excluding the RLF report, to the first network node.

In some embodiments, a method performed by the second network node comprises the following steps. At step 801, the second network node receives an RLF indication message from the fourth network node. At step 802, the second network node determines the failure cause to be handover to wrong cell from the first network node. At step 803, the second network node sends a handover report message to the first network node indicating that the handover initiated by the first network node towards second network node was a “handover to wrong cell” involving the third network node.

In some embodiments, a method performed by the first network node comprises the following steps. At step 901, the first network node receives an RLF indication message from the fourth network node. At step 902, the first network node determines the failure cause to be the handover to wrong cell from the first network node for the handover initiated by the first network node towards second network node further involving the third network node. At step 903, the first network node changes the handover parameters (Cell individual offset, A3 offset, time-to-trigger, etc.) associated with the measurement reports involving measurements towards the second network node and the third network node. In some embodiments the changing involves decreasing the cell individual offset towards the third network node and increasing the cell individual offset towards the second network node.

A general flowchart illustrating the methods performed by the fourth network node is described with respect to FIG. 7 below.

Figure 4:
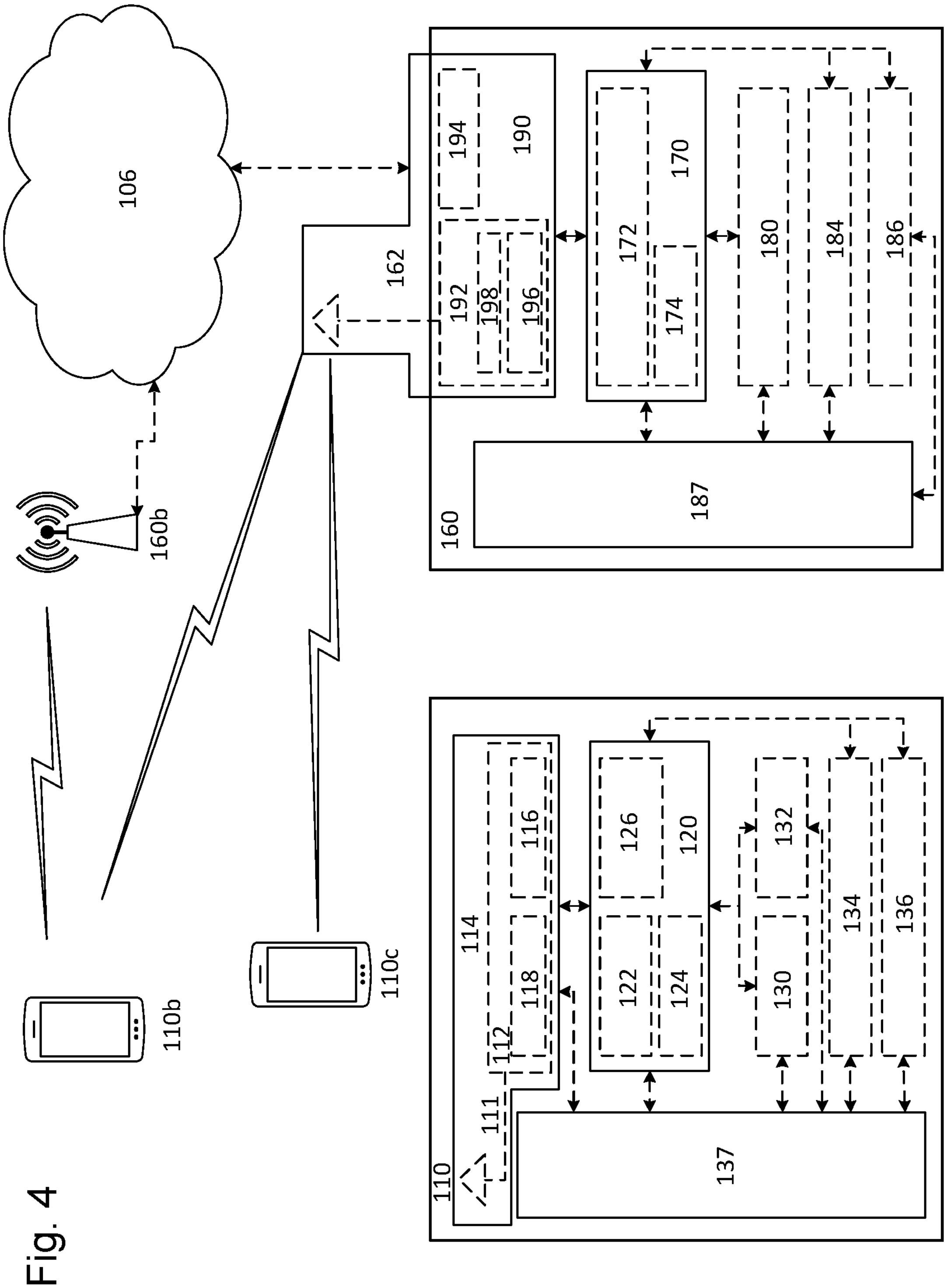
FIG. 4 is a block diagram illustrating an example wireless network.

FIG. 4 illustrates an example wireless network, according to certain embodiments. The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and WD 110 comprise various components described in more detail below. These components work together to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network.

Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations.

A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs.

As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 4, network node 160 includes processing circuitry 170, device readable medium 180, interface 190, auxiliary equipment 184, power source 186, power circuitry 187, and antenna 162. Although network node 160 illustrated in the example wireless network of FIG. 4 may represent a device that includes the illustrated combination of hardware components, other embodiments may comprise network nodes with different combinations of components.

It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node.

In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality.

For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160 but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signaling and/or data between network node 160, network 106, and/or WDs 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162.

Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or WDs via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 192 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160.

For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 4 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air.

In some embodiments, a WD may be configured to transmit and/or receive information without direct human interaction. For instance, a WD may be designed to transmit information to a network on a predetermined schedule, when triggered by an internal or external event, or in response to requests from the network.

Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device.

As yet another specific example, in an Internet of Things (IoT) scenario, a WD may represent a machine or other device that performs monitoring and/or measurements and transmits the results of such monitoring and/or measurements to another WD and/or a network node. The WD may in this case be a machine-to-machine (M2M) device, which may in a 3GPP context be referred to as an MTC device. As one example, the WD may be a UE implementing the 3GPP narrow band internet of things (NB-IoT) standard. Examples of such machines or devices are sensors, metering devices such as power meters, industrial machinery, or home or personal appliances (e.g. refrigerators, televisions, etc.) personal wearables (e.g., watches, fitness trackers, etc.).

In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. WD 110 may include multiple sets of one or more of the illustrated components for different wireless technologies supported by WD 110, such as, for example, GSM, WCDMA, LTE, NR, WiFi, WiMAX, or Bluetooth wireless technologies, just to mention a few. These wireless technologies may be integrated into the same or different chips or set of chips as other components within WD 110.

Antenna 111 may include one or more antennas or antenna arrays, configured to send and/or receive wireless signals, and is connected to interface 114. In certain alternative embodiments, antenna 111 may be separate from WD 110 and be connectable to WD 110 through an interface or port. Antenna 111, interface 114, and/or processing circuitry 120 may be configured to perform any receiving or transmitting operations described herein as being performed by a WD. Any information, data and/or signals may be received from a network node and/or another WD. In some embodiments, radio front end circuitry and/or antenna 111 may be considered an interface.

As illustrated, interface 114 comprises radio front end circuitry 112 and antenna 111. Radio front end circuitry 112 comprise one or more filters 118 and amplifiers 116. Radio front end circuitry 112 is connected to antenna 111 and processing circuitry 120 and is configured to condition signals communicated between antenna 111 and processing circuitry 120. Radio front end circuitry 112 may be coupled to or a part of antenna 111. In some embodiments, WD 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114.

Radio front end circuitry 112 may receive digital data that is to be sent out to other network nodes or WDs via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 110 components, such as device readable medium 130, WD 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of WD 110 may comprise a SOC. In some embodiments, RF transceiver circuitry 122, baseband processing circuitry 124, and application processing circuitry 126 may be on separate chips or sets of chips.

In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a WD may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hard-wired manner.

In any of those embodiments, whether executing instructions stored on a device readable storage medium or not, processing circuitry 120 can be configured to perform the described functionality. The benefits provided by such functionality are not limited to processing circuitry 120 alone or to other components of WD 110, but are enjoyed by WD 110, and/or by end users and the wireless network generally.

Processing circuitry 120 may be configured to perform any determining, calculating, or similar operations (e.g., certain obtaining operations) described herein as being performed by a WD. These operations, as performed by processing circuitry 120, may include processing information obtained by processing circuitry 120 by, for example, converting the obtained information into other information, comparing the obtained information or converted information to information stored by WD 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120. Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be integrated.

User interface equipment 132 may provide components that allow for a human user to interact with WD 110. Such interaction may be of many forms, such as visual, audial, tactile, etc. User interface equipment 132 may be operable to produce output to the user and to allow the user to provide input to WD 110. The type of interaction may vary depending on the type of user interface equipment 132 installed in WD 110. For example, if WD 110 is a smart phone, the interaction may be via a touch screen; if WD 110 is a smart meter, the interaction may be through a screen that provides usage (e.g., the number of gallons used) or a speaker that provides an audible alert (e.g., if smoke is detected).

User interface equipment 132 may include input interfaces, devices and circuits, and output interfaces, devices and circuits. User interface equipment 132 is configured to allow input of information into WD 110 and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from WD 110, and to allow processing circuitry 120 to output information from WD 110. User interface equipment 132 may include, for example, a speaker, a display, vibrating circuitry, a USB port, a headphone interface, or other output circuitry. Using one or more input and output interfaces, devices, and circuits, of user interface equipment 132, WD 110 may communicate with end users and/or the wireless network and allow them to benefit from the functionality described herein.

Auxiliary equipment 134 is operable to provide more specific functionality which may not be generally performed by WDs. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. WD 110 may further comprise power circuitry 137 for delivering power from power source 136 to the various parts of WD 110 which need power from power source 136 to carry out any functionality described or indicated herein. Power circuitry 137 may in certain embodiments comprise power management circuitry.

Power circuitry 137 may additionally or alternatively be operable to receive power from an external power source; in which case WD 110 may be connectable to the external power source (such as an electricity outlet) via input circuitry or an interface such as an electrical power cable. Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of WD 110 to which power is supplied.

Although the subject matter described herein may be implemented in any appropriate type of system using any suitable components, the embodiments disclosed herein are described in relation to a wireless network, such as the example wireless network illustrated in FIG. 4. For simplicity, the wireless network of FIG. 4 only depicts network 106, network nodes 160 and 160*b*, and WDs 110, 110*b*, and 110*c*. In practice, a wireless network may further include any additional elements suitable to support communication between wireless devices or between a wireless device and another communication device, such as a landline telephone, a service provider, or any other network node or end device. Of the illustrated components, network node 160 and wireless device (WD) 110 are depicted with additional detail. The wireless network may provide communication and other types of services to one or more wireless devices to facilitate the wireless devices' access to and/or use of the services provided by, or via, the wireless network.

Figure 5:
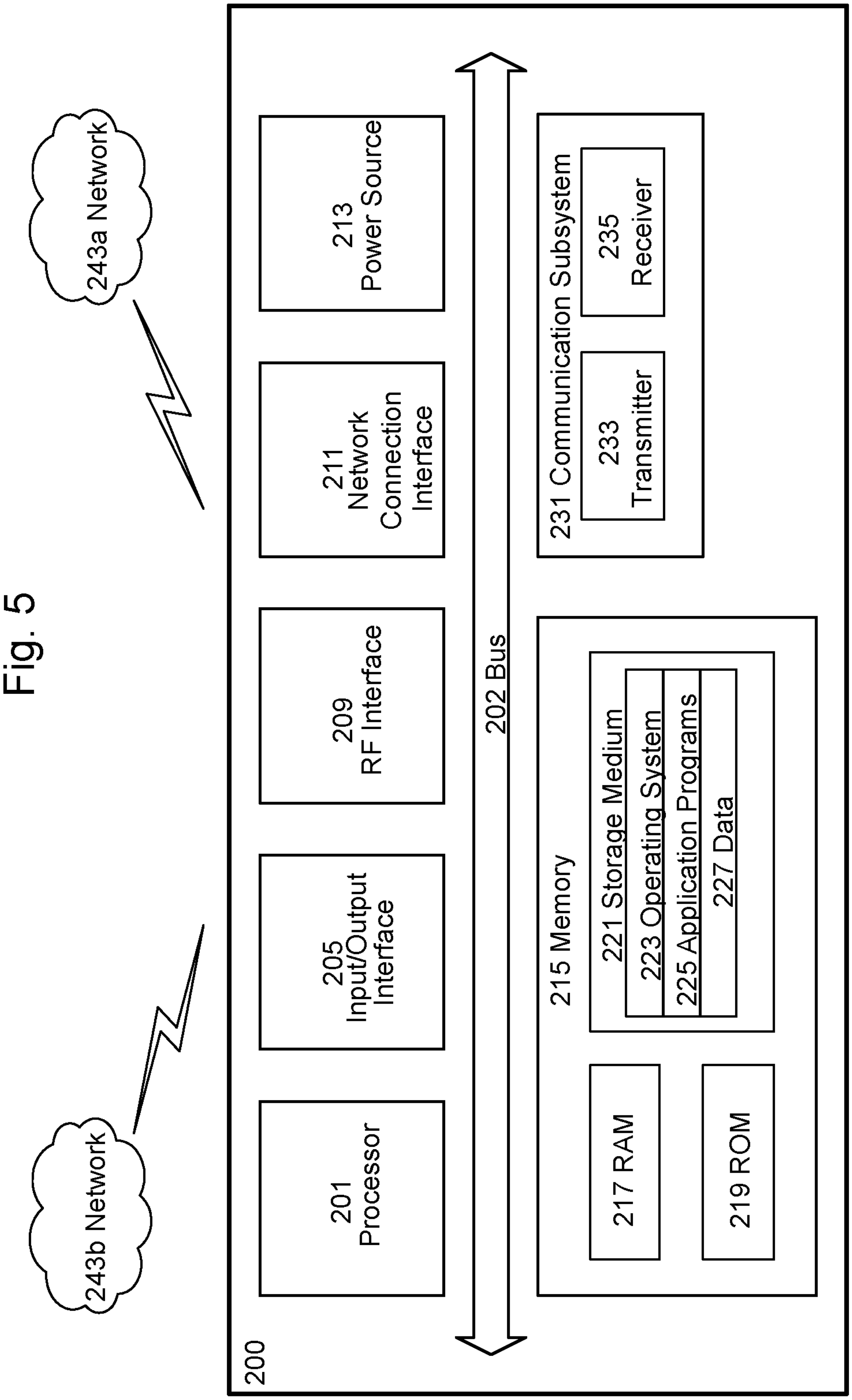
FIG. 5 illustrates an example user equipment, according to certain embodiments.

FIG. 5 illustrates an example user equipment, according to certain embodiments. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 200 may be any UE identified by the 3$^{rd}$ Generation Partnership Project (3GPP), including a NB-IoT UE, a machine type communication (MTC) UE, and/or an enhanced MTC (eMTC) UE. UE 200, as illustrated in FIG. 5, is one example of a WD configured for communication in accordance with one or more communication standards promulgated by the 3$^{rd}$ Generation Partnership Project (3GPP), such as 3GPP's GSM, UMTS, LTE, and/or 5G standards. As mentioned previously, the term WD and UE may be used interchangeable. Accordingly, although FIG. 5 is a UE, the components discussed herein are equally applicable to a WD, and vice-versa.

In FIG. 5, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 213, and/or any other component, or any combination thereof. Storage medium 221 includes operating system 223, application program 225, and data 227. In other embodiments, storage medium 221 may include other similar types of information. Certain UEs may use all the components shown in FIG. 5, or only a subset of the components. The level of integration between the components may vary from one UE to another UE. Further, certain UEs may contain multiple instances of a component, such as multiple processors, memories, transceivers, transmitters, receivers, etc.

In FIG. 5, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205.

An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof.

UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 5, RF interface 209 may be configured to provide a communication interface to RF components such as a transmitter, a receiver, and an antenna. Network connection interface 211 may be configured to provide a communication interface to network **243*a*. Network 243*a* may encompass wired and/or wireless networks such as a local-area network (LAN), a wide-area network (WAN), a computer network, a wireless network, a telecommunications network, another like network or any combination thereof. For example, network 243*a* may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211** may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory.

Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 5, processing circuitry 201 may be configured to communicate with network **243*b* using communication subsystem 231. Network 243*a* and network 243*b* may be the same network or networks or different network or networks. Communication subsystem 231 may be configured to include one or more transceivers used to communicate with network 243*b*. For example, communication subsystem 231 may be configured to include one or more transceivers used to communicate with one or more remote transceivers of another device capable of wireless communication such as another WD, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235** of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243*b* may encompass wired and/or wireless networks such as a local-area network (LAN), a wide-area network (WAN), a computer network, a wireless network, a telecommunications network, another like network or any combination thereof. For example, network 243*b* may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 6:
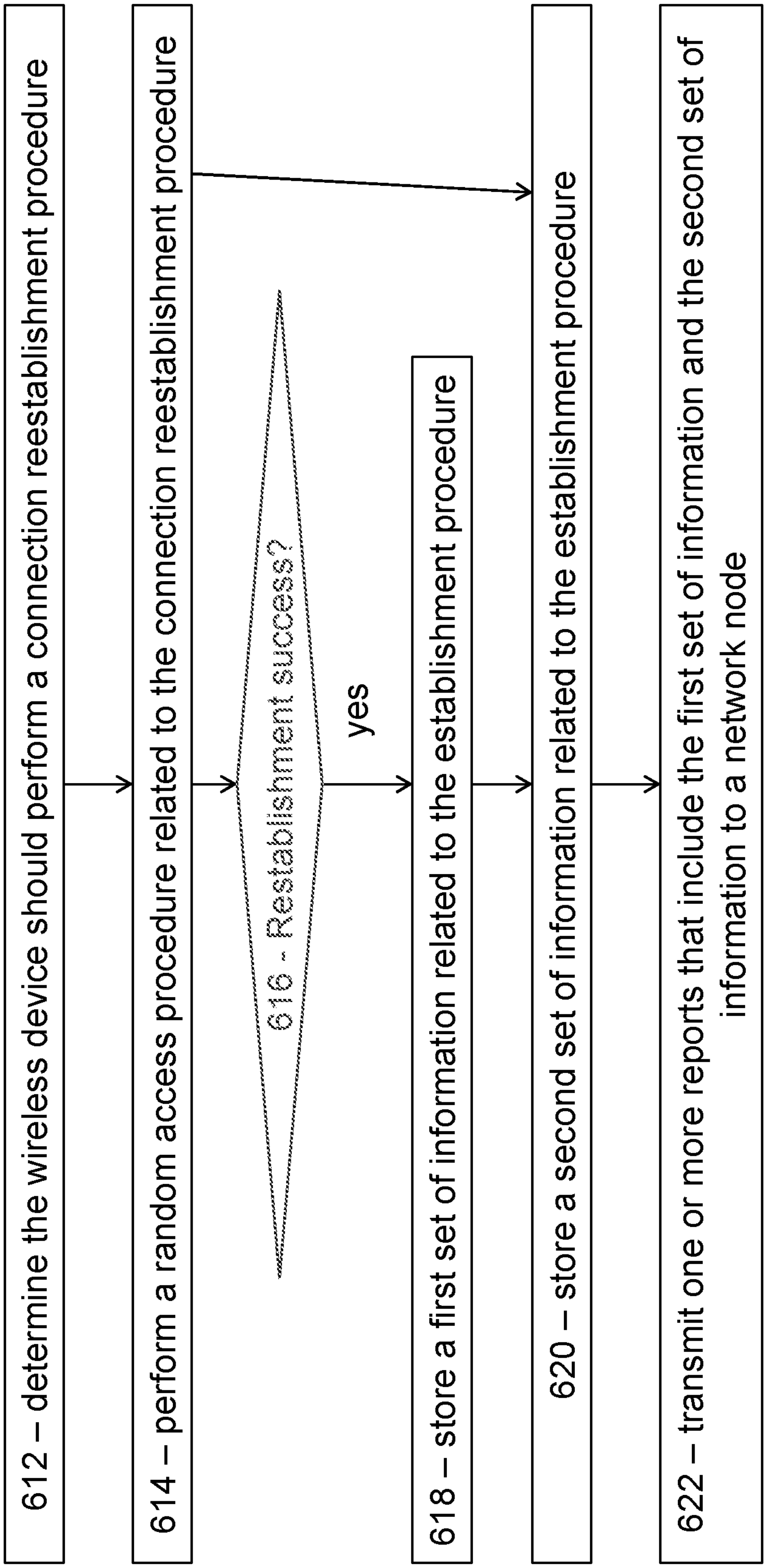
FIG. 6 is flowchart illustrating an example method in a wireless device, according to certain embodiments.

FIG. 6 is a flowchart illustrating an example method in a wireless device, according to certain embodiments. In particular embodiments, one or more steps of FIG. 6 may be performed by wireless device 110 described with respect to FIG. 4.

The method may begin at step 612, where the wireless device (e.g., wireless device 110) determines it should perform a connection reestablishment procedure. The conditions for performing a connection reestablishment procedure are described above.

At step 614, the wireless device performs a random access procedure related to the connection reestablishment procedure. The random access procedure may or may not succeed. Examples of when the random access procedure may or may not succeed are described above.

At step 616, the wireless device determines whether the reestablishment procedure was successful. When the reestablishment procedure is determined to be successful, the method continues to step 618, where the wireless device stories a first set of information related to the establishment procedure.

In particular embodiments, the wireless device stores the first set of information in a RLF report. In some embodiments, the wireless device stores the first set of information in a RA report.

In particular embodiments, the first set of information comprises any one or more of: a cell identifier of a cell in which the reestablishment procedure was performed successfully; an identifier of random access resources used for the reestablishment procedure; and an amount of time elapsed between a RLF declaration and the successful reestablishment procedure. The first set of information may comprise any one or more of: at least one of cell level and beam level radio measurements associated with the cell in which the reestablishment procedure was successful; an indication of a chronological order in which beams were used for performing one or more random access procedure related to the connection reestablishment procedure; and an indication of a location of the wireless device during the reestablishment procedure. The first set of information may comprise any suitable information according to the embodiments and examples described herein.

At step 620, irrespective of whether the reestablishment procedure is determined to be successful, the wireless device stores a second set of information related to the establishment procedure, different from the first set of information. The wireless device may store the second set of information in the RLF report.

In particular embodiments, the second set of information comprises any one or more of: an indication of whether the one more reports is associated with a successful reestablishment procedure; a cell identifier of a cell in which the reestablishment procedure was attempted; and an indication of a RLF event that triggered the reestablishment procedure. The second set of information may comprise any suitable information according to the embodiments and examples described herein.

At step 622, the wireless device transmits one or more reports that include the first set of information and the second set of information to a network node. For example, when the first set of information and the second set of information are both stored in the RLF report, the wireless device sends the RLF report to the network node. In embodiments where the first set of information is stored in an RA report and the second set of information is stored in a RLF report, the wireless device transmits both the RA report and the RLF report to the network node.

Modifications, additions, or omissions may be made to method 600 of FIG. 6. Additionally, one or more steps in the method of FIG. 6 may be performed in parallel or in any suitable order.

Figure 7:
FIG. 7 is flowchart illustrating an example method in a network node, according to certain embodiments.

FIG. 7 is a flowchart illustrating an example method in a network node, according to certain embodiments. In particular embodiments, one or more steps of FIG. 7 may be performed by network node 160 described with respect to FIG. 4.

The method may begin at step 712, where a first network node (e.g., network node 160) receives a report from a wireless device. The report may comprise one or both of the RA report and RLF report and include the first set of information and second set of information described with respect to FIG. 6.

At step 714, the network node determines a source of a failed handover based on the report. For example, based on the first set of information and the second set of information the network node can determine the failure cause. As one example, when the RLF report indicates that the re-establishment was successful and if the re-establishment cell was different from the source cell (previousPCell in the RLF report) and the target cell (failedPCell in the RLF report) of the handover, then the cell (source cell of the handover) that performs the handover failure classification can classify this failure as a handover to wrong cell scenario and perform the handover parameter tuning related to target cell (e.g., increase the cell individual offset) and reestablishment cell (e.g., decrease the cell individual offset).

At step 716, the network node transmits an indication of the source of the failed handover to a second network node. The indication may include the RA and/or RLF reports, or the indication may be any other suitable signaling to inform the second network node about the source of the failure. In some embodiments, the second network node may comprise a source network node. The source network node may adjust is operating parameters based on the indication, or the source network node may forward the indication to a target network node or any other network node. In some embodiments the second network node may comprise a target network node. The target network node may adjust is operating parameters based on the indication, or the target network node may forward the indication to a source network node or any other network node.

To avoid confusion, the embodiments and examples described previously above referred to the first network node as the source node of the handover, the second network node as the target node of the handover, the third network node as the successful re-establishment node of the handover, and the fourth network node refers to the network node in which the UE reports the RLF report. In the example of FIG. 7, the network nodes are numbered differently. The first network node refers to the network node in which the UE reports the RA and/or RLF report (i.e., previously the fourth network node) and the second network node refers to any one of the source of the handover, target of the handover, or successful re-establishment node (i.e., any of the previous first, second, or third network nodes).

Modifications, additions, or omissions may be made to method 700 of FIG. 7. Additionally, one or more steps in the method of FIG. 7 may be performed in parallel or in any suitable order.

Figure 8:
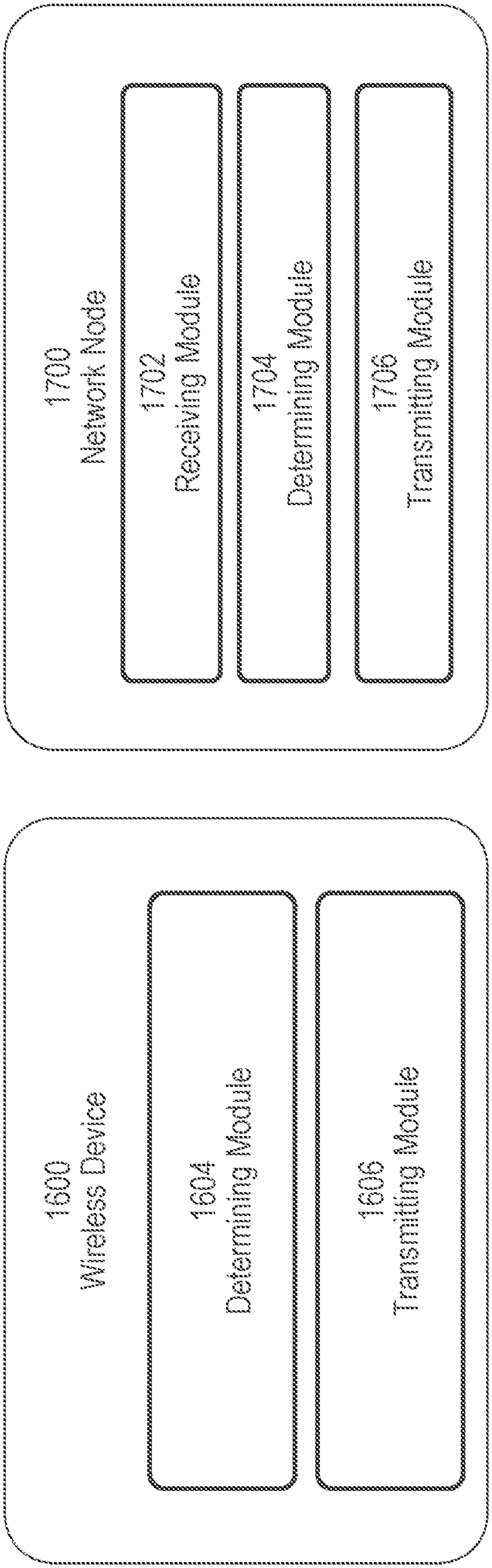
FIG. 8 illustrates a schematic block diagram of a wireless device and a network node in a wireless network, according to certain embodiments.

FIG. 8 illustrates a schematic block diagram of two apparatuses in a wireless network (for example, the wireless network illustrated in FIG. 4). The apparatuses include a wireless device and a network node (e.g., wireless device 110 and network node 160 illustrated in FIG. 4). Apparatuses 1600 and 1700 are operable to carry out the example methods described with reference to FIGS. 6 and 7, respectively, and possibly any other processes or methods disclosed herein. It is also to be understood that the methods of FIGS. 6 and 7 are not necessarily carried out solely by apparatuses 1600 and/or 1700. At least some operations of the methods can be performed by one or more other entities.

Virtual apparatuses 1600 and 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments.

In some implementations, the processing circuitry may be used to cause determining module 1604, transmitting module 1606, and any other suitable units of apparatus 1600 to perform corresponding functions according one or more embodiments of the present disclosure. Similarly, the processing circuitry described above may be used to cause receiving module 1702, determining module 1704, transmitting module 1706, and any other suitable units of apparatus 1700 to perform corresponding functions according one or more embodiments of the present disclosure.

As illustrated in FIG. 8, apparatus 1600 includes determining module 1604 is configured to determine whether a random access procedure was successful and to store first and second sets of information regarding the procedure according to any of the embodiments and examples described herein. Transmitting module 1606 is configured to transmit a report (RLF report and/or RA report) to a network node, according to any of the embodiments and examples described herein.

As illustrated in FIG. 8, apparatus 1700 includes receiving module 1702 configured to receive a report (RLF report and/or RA report) according to any of the embodiments and examples described herein. Determining module 1704 is configured to determine a failure cause of a re-establishment procedure according to any of the embodiments and examples described herein. Transmitting module 1706 is configured to transmit an indication of the failure to another network node, according to any of the embodiments and examples described herein.

Figure 9:
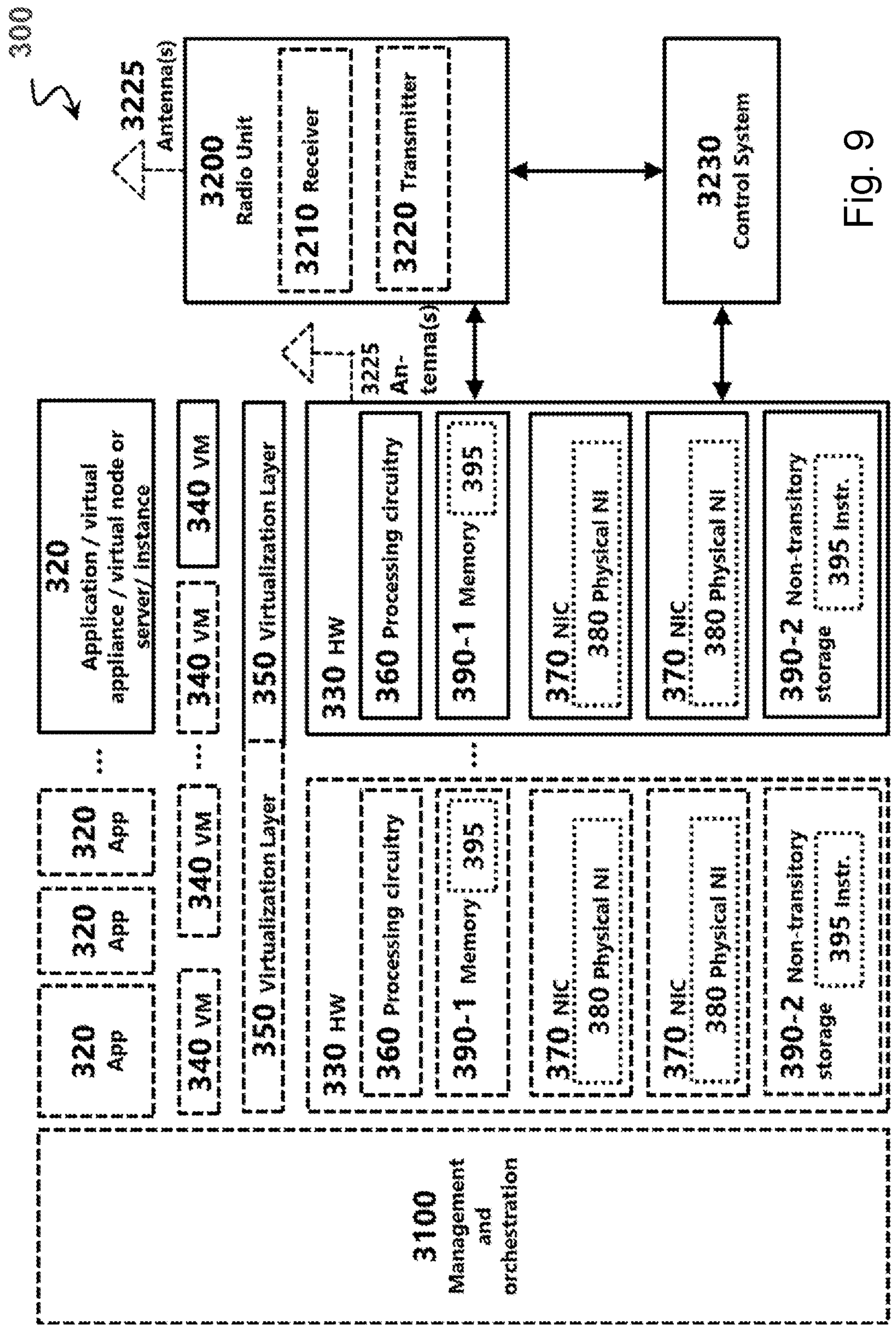
FIG. 9 illustrates an example virtualization environment, according to certain embodiments.

FIG. 9 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 9, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high-volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 18.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signaling can be effected with the use of control system 3230 which may alternatively be used for communication between the hardware nodes 330 and radio units 3200.

Figure 10:
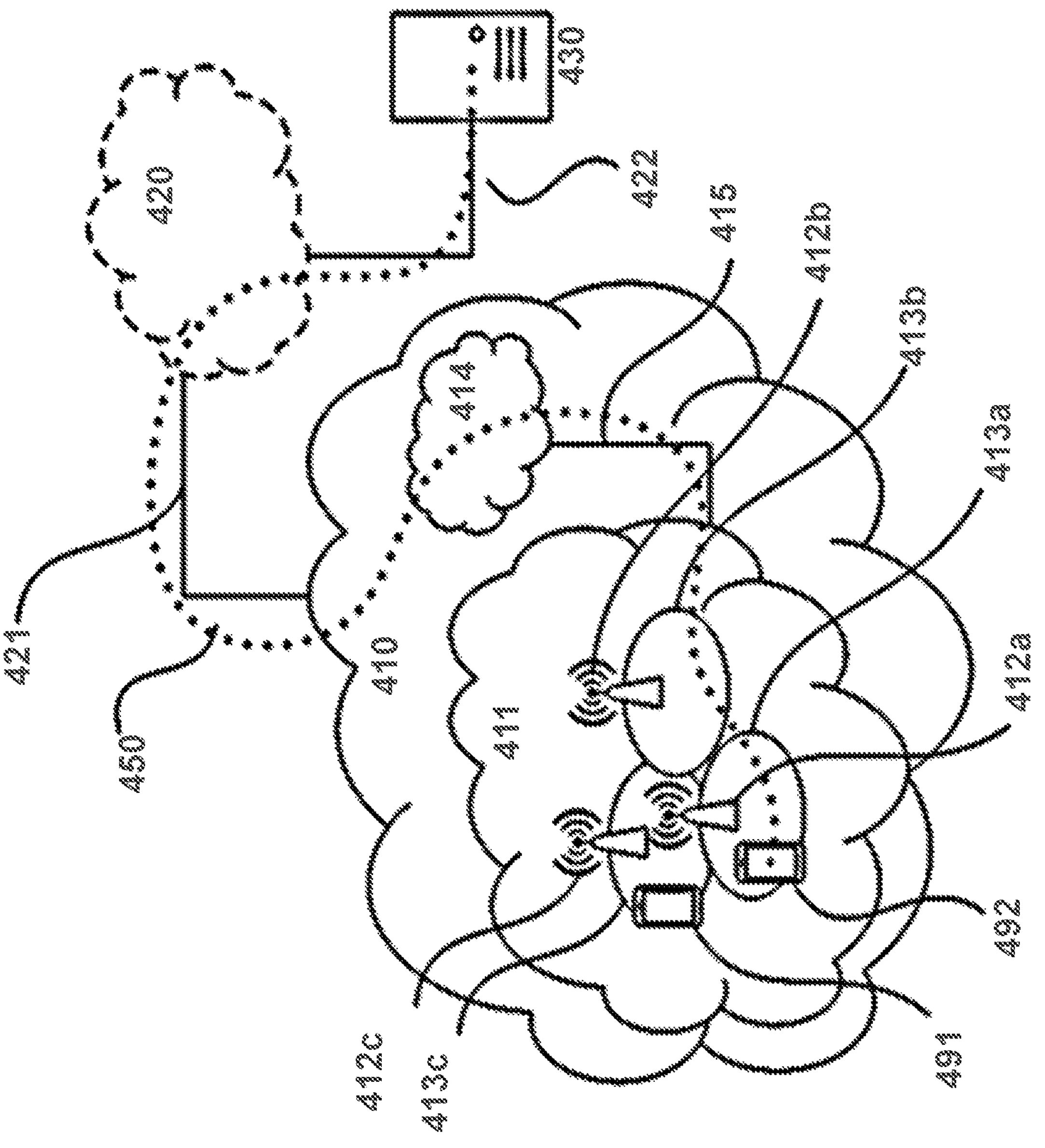
FIG. 10 illustrates an example telecommunication network connected via an intermediate network to a host computer, according to certain embodiments.

With reference to FIG. 10, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 10 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Figure 11:
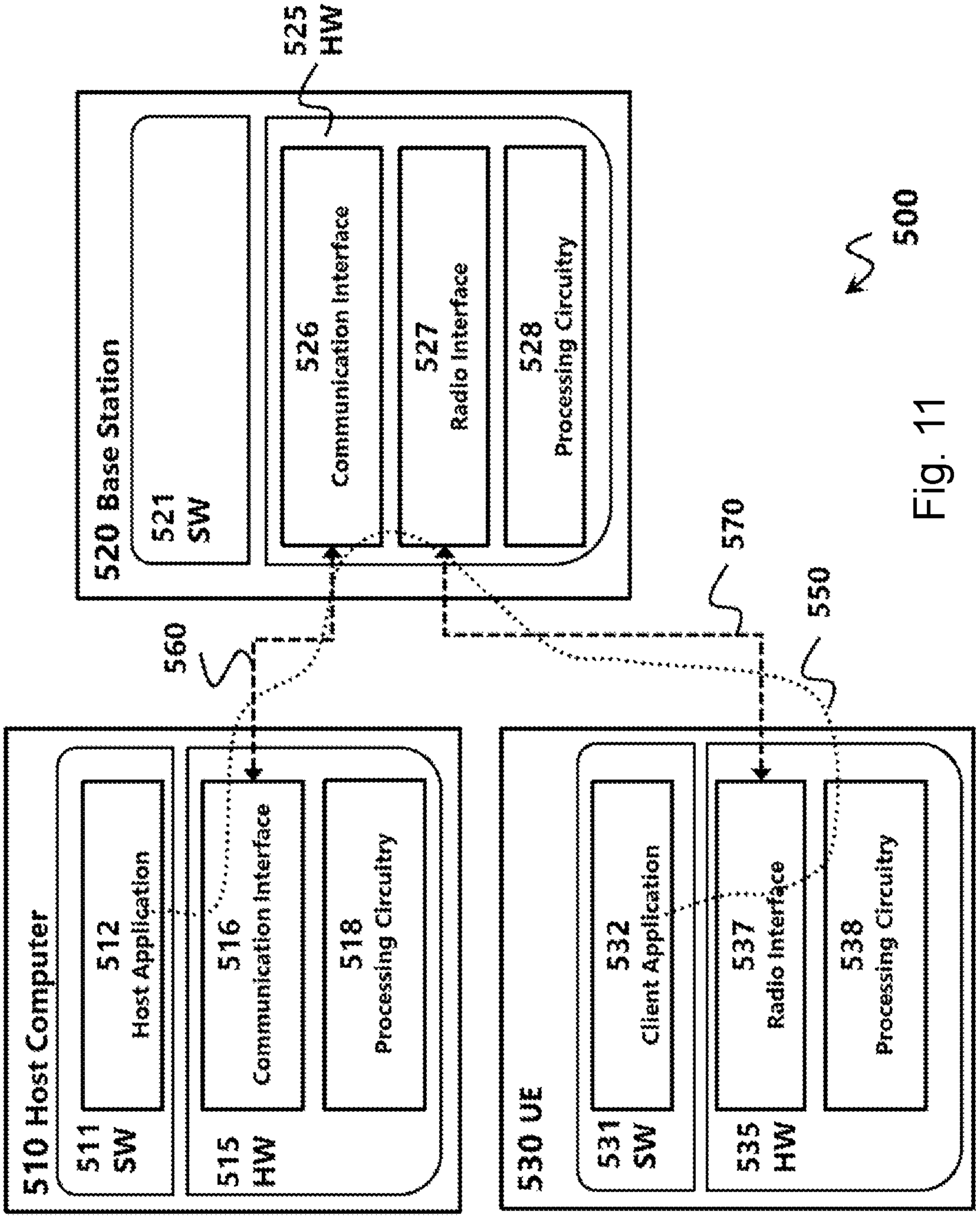
FIG. 11 illustrates an example host computer communicating via a base station with a user equipment over a partially wireless connection, according to certain embodiments.

FIG. 11 illustrates an example host computer communicating via a base station with a user equipment over a partially wireless connection, according to certain embodiments. Example implementations, in accordance with an embodiment of the UE, base station and host computer discussed in the preceding paragraphs will now be described with reference to FIG. 11. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 11) served by base station 520. Communication interface 526 may be configured to facilitate connection 560 to host computer 510. Connection 560 may be direct, or it may pass through a core network (not shown in FIG. 11) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

It is noted that host computer 510, base station 520 and UE 530 illustrated in FIG. 11 may be similar or identical to host computer 430, one of base stations 412*a*, 412*b*, 412*c* and one of UEs 491, 492 of FIG. 9, respectively. This is to say, the inner workings of these entities may be as shown in FIG. 11 and independently, the surrounding network topology may be that of FIG. 9.

In FIG. 11, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., based on load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the signaling overhead and reduce latency, which may provide faster internet access for users.

A measurement procedure may be provided for monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 12:
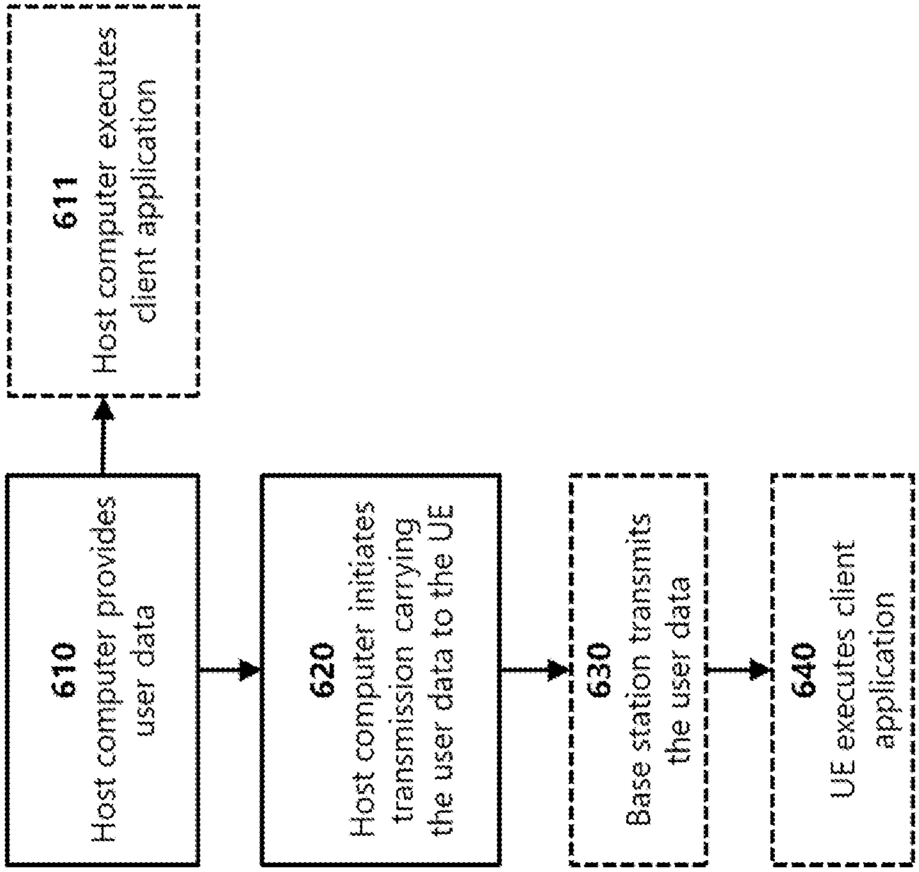
FIG. 12 is a flowchart illustrating a method implemented, according to certain embodiments.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section.

In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 13:
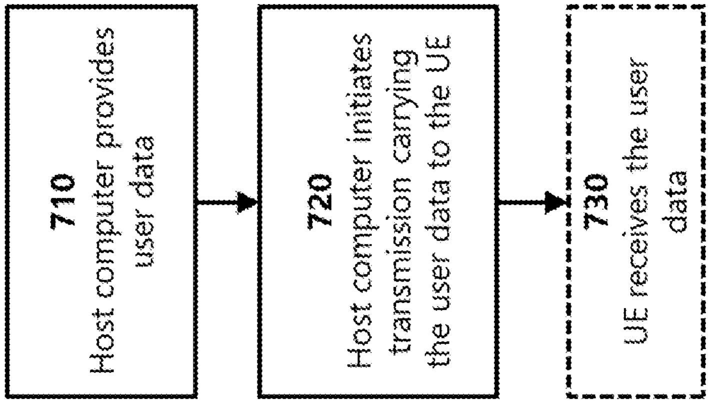
FIG. 13 is a flowchart illustrating a method implemented in a communication system, according to certain embodiments.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section.

In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 14:
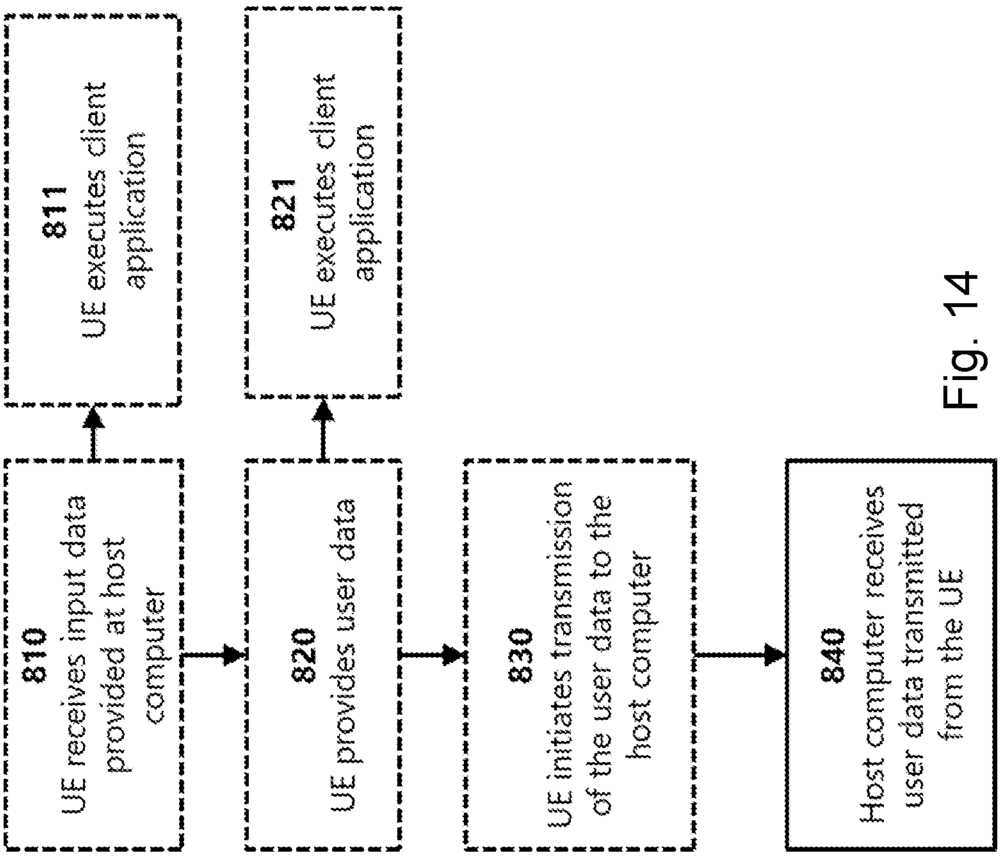
FIG. 14 is a flowchart illustrating a method implemented in a communication system, according to certain embodiments.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section.

In step 810 (which may be optional), the UE receives input data provided by the host computer. Additionally, or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 15:
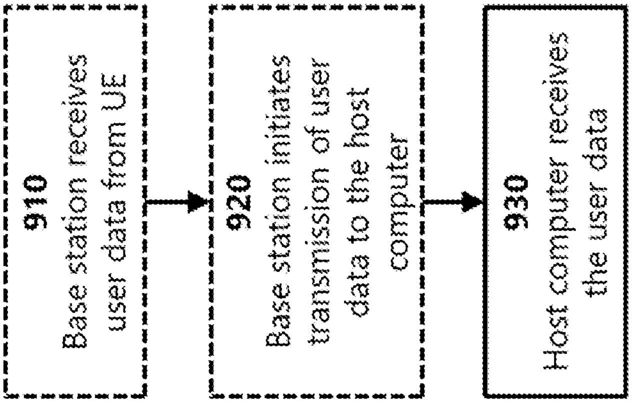
FIG. 15 is a flowchart illustrating a method implemented in a communication system, according to certain embodiments.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section.

In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Some example embodiments are described below.

1. A computer program product comprising a non-transitory computer readable medium storing computer readable program code, the computer readable program code operable, when executed by processing circuitry to:

determine the wireless device should perform a connection reestablishment procedure;

perform a random access procedure related to the connection reestablishment procedure;

determine whether the reestablishment procedure was successful;

when the reestablishment procedure is determined to be successful, store a first set of information related to the establishment procedure;

store a second set of information related to the establishment procedure, different from the first set of information, irrespective of whether the reestablishment procedure is determined to be successful; and transmit one or more reports that include the first set of information and the second set of information to a network node.

2. The computer program product of embodiment 1, wherein the program code is operable to:

store the first set of information by storing the first set of information in a radio link failure (RLF) report;

store the second set of information by storing the second set of information in the RLF report; and transmit one or more reports to the network node by transmitting the RLF report.

3. The computer program product of embodiment 1, wherein the program code is operable to:

store the first set of information by storing the first set of information in a random access (RA) report;

store the second set of information by storing the second set of information in a radio link failure (RLF) report; and transmit one or more reports to the network node by transmitting the RLF report and the RA report.

4. The computer program product of any one of embodiments 1-3, wherein the first set of information comprises any one or more of:

a cell identifier of a cell in which the reestablishment procedure was performed successfully;

an identifier of random access resources used for the reestablishment procedure; and an amount of time elapsed between a radio link failure (RLF) declaration and the successful reestablishment procedure.

5. The computer program product of any one of embodiments 1-4, wherein the first set of information comprises any one or more of:

at least one of cell level and beam level radio measurements associated with the cell in which the reestablishment procedure was successful;

an indication of a chronological order in which beams were used for performing one or more random access procedure related to the connection reestablishment procedure; and an indication of a location of the wireless device during the reestablishment procedure.

6. The computer program product of any one of embodiments 1-5, wherein the second set of information comprises any one or more of:

an indication of whether the one more reports is associated with a successful reestablishment procedure;

a cell identifier of a cell in which the reestablishment procedure was attempted; and an indication of a radio link failure (RLF) event that triggered the reestablishment procedure.

7. A computer program product comprising a non-transitory computer readable medium storing computer readable program code, the computer readable program code operable, when executed by processing circuitry to:

receive a report from a wireless device;

determine a source of a failed handover based on the report; and transmit an indication of the source of the failed handover to a second network node.

8. The computer program product of embodiment 7, wherein the second network node comprises at least one of a source node of the failed handover and a target node of the failed handover.

9. The computer program product of any one of embodiments 7-8, wherein the received report comprises a radio link failure (RLF) report.

10. The computer program product of any one of embodiments 7-9, wherein the report comprises any one or more of:

a cell identifier of a cell in which a reestablishment procedure was performed successfully;

an identifier of random access resources used for a reestablishment procedure; and an amount of time elapsed between a radio link failure (RLF) declaration and a successful reestablishment procedure.

11. The computer program product of any one of embodiments 7-10, wherein the report comprises any one or more of:

at least one of cell level and beam level radio measurements associated with a cell in which a reestablishment procedure was successful;

an indication of a chronological order in which beams were used for performing one or more random access procedure related to the connection reestablishment procedure; and an indication of a location of a wireless device during the reestablishment procedure.

12. The computer program product of any one of embodiments 7-11, wherein the report comprises any one or more of:

an indication of whether the report is associated with a successful reestablishment procedure;

a cell identifier of a cell in which a reestablishment procedure was attempted; and an indication of a radio link failure (RLF) event that triggered a reestablishment procedure.

13. A wireless device comprises a determining module and a transmitting module:

the determining module is operable to:

determine the wireless device should perform a connection reestablishment procedure;

perform a random access procedure related to the connection reestablishment procedure;

determine whether the reestablishment procedure was successful;

when the reestablishment procedure is determined to be successful, store a first set of information related to the establishment procedure;

store a second set of information related to the establishment procedure, different from the first set of information, irrespective of whether the reestablishment procedure is determined to be successful; and the transmitting module is operable to transmit one or more reports that include the first set of information and the second set of information to a network node.

14. A network node comprising a receiving module, determining module, and a transmitting module:

the receiving module operable to receive a report from a wireless device;

the determining module operable to determine a source of a failed handover based on the report; and the transmitting module operable to transmit an indication of the source of the failed handover to a second network node.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, “each” refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The foregoing description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to “one embodiment,” “an embodiment,” “an example embodiment,” etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the scope of this disclosure, as defined by the claims below.

At least some of the following abbreviations may be used in this disclosure. If there is an inconsistency between abbreviations, preference should be given to how it is used above. If listed multiple times below, the first listing should be preferred over any subsequent listing(s).

1×RTT CDMA2000 1× Radio Transmission Technology
3GPP 3rd Generation Partnership Project
5G 5th Generation
ACK/NACK Acknowledgment/Non-acknowledgment
BCCH Broadcast Control Channel
BCH Broadcast Channel
CA Carrier Aggregation
CBRA Contention-Based Random Access
CC Carrier Component
CDMA Code Division Multiplexing Access
CFRA Contention-Free Random Access
CG Configured Grant
CGI Cell Global Identifier
CP Cyclic Prefix
CQI Channel Quality information
C-RNTI Cell RNTI
CSI Channel State Information
DCCH Dedicated Control Channel
DCI Downlink Control Information
DFTS-OFDM Discrete Fourier Transform Spread OFDM
DL Downlink
DM Demodulation
DMRS Demodulation Reference Signal
DRX Discontinuous Reception
DTX Discontinuous Transmission
DTCH Dedicated Traffic Channel
E-CID Enhanced Cell-ID (positioning method)
E-SMLC Evolved-Serving Mobile Location Centre
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
GERAN GSM EDGE Radio Access Network
gNB Base station in NR
GNSS Global Navigation Satellite System
GSM Global System for Mobile communication
HO Handover
HSPA High Speed Packet Access
HRPD High Rate Packet Data
IAB Integrated Access and Backhaul
LOS Line of Sight
LTE Long-Term Evolution
MAC Medium Access Control
MCS Modulation and Coding Scheme
MDT Minimization of Drive Tests
MIB Master Information Block
MME Mobility Management Entity
MSC Mobile Switching Center
NPDCCH Narrowband Physical Downlink Control Channel
NR New Radio
OFDM Orthogonal Frequency Division Multiplexing
OFDMA Orthogonal Frequency Division Multiple Access
OSS Operations Support System
OTDOA Observed Time Difference of Arrival
O&M Operation and Maintenance
PBCH Physical Broadcast Channel
P-CCPCH Primary Common Control Physical Channel
PCell Primary Cell
PDCCH Physical Downlink Control Channel
PDSCH Physical Downlink Shared Channel
PGW Packet Gateway
PLMN Public Land Mobile Network
PMI Precoder Matrix Indicator
PRACH Physical Random Access Channel
PRS Positioning Reference Signal
PSS Primary Synchronization Signal
PUCCH Physical Uplink Control Channel
PUR Preconfigured Uplink Resources
PUSCH Physical Uplink Shared Channel
RACH Random Access Channel
QAM Quadrature Amplitude Modulation
RA Random Access
RAN Radio Access Network
RAT Radio Access Technology
RLF Radio Link Failure
RLM Radio Link Management
RNC Radio Network Controller
RNTI Radio Network Temporary Identifier
RRC Radio Resource Control
RRM Radio Resource Management
RS Reference Signal
RSCP Received Signal Code Power
RSRP Reference Symbol Received Power OR Reference Signal Received Power
RSRQ Reference Signal Received Quality OR Reference Symbol Received Quality
RSSI Received Signal Strength Indicator
RSTD Reference Signal Time Difference
SCH Synchronization Channel
SCell Secondary Cell
SDU Service Data Unit
SFN System Frame Number
SGW Serving Gateway
SI System Information
SIB System Information Block
SNR Signal to Noise Ratio
SON Self Optimized Network
SPS Semi-Persistent Scheduling
SUL Supplemental Uplink
SS Synchronization Signal
SSB Synchronization Signal Block
SSS Secondary Synchronization Signal
TA Timing Advance
TDD Time Division Duplex
TDOA Time Difference of Arrival
TO Transmission Occasion
TOA Time of Arrival
TSS Tertiary Synchronization Signal
TTI Transmission Time Interval
UE User Equipment
UL Uplink
URLLC Ultra-Reliable and Low-Latency Communications
UMTS Universal Mobile Telecommunication System
USIM Universal Subscriber Identity Module
UTDOA Uplink Time Difference of Arrival
UTRA Universal Terrestrial Radio Access
UTRAN Universal Terrestrial Radio Access Network
WCDMA Wide CDMA
WLAN Wide Local Area Network

The invention claimed is:

1. A method performed by a wireless device, the method comprising:

determining the wireless device should perform a connection reestablishment procedure;

performing a random access procedure related to the connection reestablishment procedure;

determining whether the reestablishment procedure was successful;

when the reestablishment procedure is determined to be successful, storing a first set of information related to the reestablishment procedure in a random access (RA) report, wherein the first set of information comprises a cell identifier of a cell in which the reestablishment procedure was performed successfully;

storing a second set of information related to the reestablishment procedure in a radio link failure (RLF) report, different from the first set of information, irrespective of whether the reestablishment procedure is determined to be successful, wherein the second set of information comprises a cell identifier of a cell in which the reestablishment procedure was attempted and an indication of an RLF event that triggered the reestablishment procedure; and transmitting the RA report and the RLF report that include the first set of information and the second set of information to a network node.

2. The method of claim 1, wherein the first set of information comprises any one or more of:

an identifier of random access resources used for the reestablishment procedure; and an amount of time elapsed between an RLF declaration and the successful reestablishment procedure.

3. The method of claim 1, wherein the first set of information comprises any one or more of:

at least one of cell level and beam level radio measurements associated with the cell in which the reestablishment procedure was successful;

an indication of a chronological order in which beams were used for performing one or more random access procedure related to the connection reestablishment procedure; and an indication of a location of the wireless device during the reestablishment procedure.

4. The method of claim 1, wherein the second set of information further comprises an indication of whether the reestablishment was successful in the cell in which the reestablishment procedure was attempted.

5. A wireless device comprising processing circuitry operable to:

determine the wireless device should perform a connection reestablishment procedure;

perform a random access procedure related to the connection reestablishment procedure;

determine whether the reestablishment procedure was successful;

when the reestablishment procedure is determined to be successful, store a first set of information related to the reestablishment procedure in a random access (RA) report, wherein the first set of information comprises a cell identifier of a cell in which the reestablishment procedure was performed successfully;

store a second set of information related to the reestablishment procedure in a radio link failure (RLF) report, different from the first set of information, irrespective of whether the reestablishment procedure is determined to be successful, wherein the second set of information comprises a cell identifier of a cell in which the reestablishment procedure was attempted and an indication of an RLF event that triggered the reestablishment procedure; and transmit the RA report and the RLF report that include the first set of information and the second set of information to a network node.

6. The wireless device of claim 5, wherein the first set of information comprises any one or more of:

an identifier of random access resources used for the reestablishment procedure; and an amount of time elapsed between an RLF declaration and the successful reestablishment procedure.

7. The wireless device of claim 5, wherein the first set of information comprises any one or more of:

at least one of cell level and beam level radio measurements associated with the cell in which the reestablishment procedure was successful;

an indication of a chronological order in which beams were used for performing one or more random access procedure related to the connection reestablishment procedure; and an indication of a location of the wireless device during the reestablishment procedure.

8. The wireless device of claim 5, wherein the second set of information further comprises an indication of whether the reestablishment was successful in the cell in which the reestablishment procedure was attempted.

9. A method performed by a first network node, the method comprising:

receiving a random access (RA) report from a wireless device, wherein the RA report comprises a first set of information comprising a cell identifier of a cell in which a reestablishment procedure was performed successfully by the wireless device;

receiving a radio link failure (RLF) report from the wireless device, wherein the RLF report comprises a second set of information comprising a cell identifier of a cell in which the reestablishment procedure was attempted and an indication of an RLF event that triggered the reestablishment procedure;

determining a source of a failed handover based on the RA report and the RLF report; and transmitting an indication of the source of the failed handover to a second network node.

10. The method of claim 9, wherein the second network node comprises at least one of a source node of the failed handover and a target node of the failed handover.

11. A network node comprising processing circuitry operable to:

receive a random access (RA) report from a wireless device, wherein the RA report comprises a first set of information comprising a cell identifier of a cell in which a reestablishment procedure was performed successfully by the wireless device;

receive a radio link failure (RLF) report from the wireless device, wherein the RLF report comprises a second set of information comprising a cell identifier of a cell in which the reestablishment procedure was attempted and an indication of an RLF event that triggered the reestablishment procedure;

determine a source of a failed handover based on the RA report and the RLF report; and transmit an indication of the source of the failed handover to a second network node.

12. The network node of claim 11, wherein the second network node comprises at least one of a source node of the failed handover and a target node of the failed handover.

13. The network node of claim 11, wherein the RA report comprises any one or more of:

an identifier of random access resources used for a reestablishment procedure; and an amount of time elapsed between an RLF declaration and a successful reestablishment procedure.

14. The network node of claim 11, wherein the RA report comprises any one or more of:

at least one of cell level and beam level radio measurements associated with a cell in which a reestablishment procedure was successful;

an indication of a chronological order in which beams were used for performing one or more random access procedure related to the connection reestablishment procedure; and an indication of a location of a wireless device during the reestablishment procedure.

15. The network node of claim 11, wherein the RLE report further comprises an indication of whether the reestablishment was successful in the cell in which the reestablishment procedure was attempted.

* * * * *